United States Patent [19]

Jennings et al.

[11] Patent Number: 5,794,218
[45] Date of Patent: Aug. 11, 1998

[54] AUTOMATED MULTILINGUAL INTERACTIVE SYSTEM AND METHOD TO PERFORM FINANCIAL TRANSACTIONS

[75] Inventors: Horton W. Jennings, Chicago, Ill.; Ronald Padalino, Westlake Village, Calif.; Robert Peralta, Chicago; Nigel R. Pinnell, Highland Park, both of Ill.; Philip C. Shinn, Los Angeles, Calif.

[73] Assignee: Citibank, N.A., New York, N.Y.

[21] Appl. No.: 586,242

[22] Filed: Jan. 16, 1996

[51] Int. Cl.$^6$ ..................................................... G06F 17/60
[52] U.S. Cl. ...................................... 705/35; 705/1; 704/8
[58] Field of Search .................... 705/35, 1; 707/503; 235/379; 704/1, 2, 10, 8

[56] References Cited

U.S. PATENT DOCUMENTS

| | | | |
|---|---|---|---|
| 4,882,681 | 11/1989 | Brotz | 704/3 |
| 5,136,633 | 8/1992 | Tejada et al. | |
| 5,440,615 | 8/1995 | Caccuro et al. | |
| 5,659,165 | 8/1997 | Jennings et al. | 235/379 |

OTHER PUBLICATIONS

PR Newswire, "Swiss bank corporation selects microlog for telephone banking system.", pp. 1–2, Jun. 21, 1995.

Electronic Payment International, "Visa Interactive develops voice-recognition.", n95, p. 5, Mar. 31, 1995.

PCT International Search Report –PCT/US96/19753.

*Primary Examiner*—Gail O. Hayes
*Assistant Examiner*—Steve Knuth
*Attorney, Agent, or Firm*—George T. Marcou; Kilpatrick Stockton LLP

[57] ABSTRACT

A system and method for allowing telephone-based interactive performance of financial transactions in multiple languages. The system prompts the customer of a financial institution in various languages until the customer's language and home country are identified. The system then connects the customer telephonically with a representative who speaks the customer's language and who can authorize the transaction by accessing the customer's records. Authorization by the local representative and record keeping are also provided.

48 Claims, 35 Drawing Sheets

FIG. 24

Branches Database

| Field Name | Description | Example |
|---|---|---|
| BranchCode | 5 digit code | 12345 |
| BranchName | string up to 50 characters | Winchester branch |
| CountryCode | 3 digit code (ISO) | 123 |
| CountryName | string up to 50 characters | USA |
| TelephoneNumber1 | digits up to 20, includes cc | 19115551234 |
| FaxNumber1 | digits up to 20, includes cc | 19115551235 |
| Address | string up to 100 characters | 3100 Ocean Park Blvd. Santa Claus, CA 90405 USA |
| Contact1Name | string up to 100 characters | Johnny Banker |
| Contact2Name | string up to 100 characters | Jefferson Davis Doe |
| Language | string up to 20 characters | English |
| Currency | string up to 3 characters (ISO) | USD |
| TelephoneNumber2 | digits up to 20, includes cc | 19115551129 |
| FaxNumber2 | digits up to 20, includes cc | 19115551130 |
| EmailAddress | string up to 50 characters | Central Station |

FIG. 25

Home Bank Centers Database

| Field Name | Description | Example |
|---|---|---|
| CountryCode | 3 digit code (ISO) | 123 |
| HomeBankCenterName | string up to 100 characters | San Antonio USA |
| Address | string up to 200 characters | 1234 Mockingbird lane, San Antonio, Texas |
| TelephoneNumber | digits up to 20, includes cc | 12345678910 |
| ContactName | string up to 100 characters | SuperDave |
| ContactPhoneNumber | digits up to 20 | 123456789 |
| FaxNumber1 | digits up to 20 | 123456789 |
| FaxNumber2 | digits up to 20 | 12141234567 |
| Language | string up to 20 characters | English |
| EmailAddress | string up to 50 characters | Station Zero |
| Currency | string up to 3 characters (ISO) | BEF |

FIG. 26

Businesses Database

| Field Name | Description | Example |
|---|---|---|
| CountryCode | 3 digit code (ISO) | 123 |
| BusinessName | string up to 100 characters | France |
| ContactName | string up to 100 charaters | John Paul |
| PhoneNumber | digits up to 20 | 123456789 |
| FaxNumber | digits up to 20 | 123456789 |
| EmailAddress | string up to 50 characters | JP France |
| BusinessAddress | string up to 100 charaters | 28 Rue de la Revolution Paris, France |

FIG. 27

Transaction Log Database

| Field Name | Description | Example |
|---|---|---|
| Date | dd-mm-yyyy | 02-24-1995 |
| Time | hh:mm:ss | 21:35:05 |
| Number | running total number | 1234 |
| BranchName | string up to 50 characters | Winchester branch |
| BranchCode | 5 digit code | 12345 |
| BranchCountryCode | 3 digit code (ISO) | 123 |
| BranchCountryName | string up to 50 characters | USA |
| HomeBankName | string up to 50 characters | Tokyo |
| HomeBankCountryCode | 3 digit code (ISO) | 123 |
| BranchRepID | 2 digits | 12 |
| HomeBankRepID | 2 digits | 12 |
| CustomerID | digits up to 16 | 1234567890123456 |
| AmountDispensed | float | 1.23456 |
| AmountDebited | float | 1.23456 |
| AmountInUSD | float | 1.23456 |
| Dispensed/DebitedFXRate | float | 1.23456 |

Summary of Transactions Report

FIG. 28

Emergency Cash Transaction Summary Report for:

Country Code: 123  Country Name: France  For the week of: 5/1-5/5 1995
Sent to: John Paul  At fax number: 1234567  On: 5/6 1995
Sent by fax number 23542342

Transactions approved by your Home Bank Unit:
Times and dates are GMT

| Numb | Date | Time | Ctry | Bra | StaffID | USD | FFR | Account Number |
|---|---|---|---|---|---|---|---|---|
| 27 | 5/1 | 10:03 | USA | 565 | 22 | 1723.67 | 6777.32 | 1234456789 |
| 32 | 5/4 | 23:11 | DEM | 234 | 22 | 8787.43 | 9874.34 | 2349872348 |
| . . |
| . . |

This totals 8 transactions for a total of 99823.23 USD or 23842.34 FFR

Transactions completed by your branches:

| Numb | Date | Time | Ctry | Bra | StaffID | USD | FFR | Account Number |
|---|---|---|---|---|---|---|---|---|
| 22 | 5/1 | 9:04 | JPY | 34 | 234235.23 | 234234.34 | 3245342345 |
| 92 | 5/4 | 19:04 | USD | 45 | 563455.34 | 5345435.5 | 3445434533 |
| . . |
| . . |

This totals 4 transactions for a total of 23423.34 USD or 23432.23 FFR

FIG. 29

Facsimile Confirming Transaction Sent to Branch

| Title | Sample Data | Data Source |
|---|---|---|
| Sent to: | Emma Richtoffen | BranchContact |
| At Fax: | 123123123123 | BranchFaxNumber |
| Date and Time: | 15 December, 1995<br>14:25 GMT | DateGMT<br>TimeGMT |
| Branch Contact | Emma Richtoffen | BranchContact |
| Branch Fax Number | 123123123123 | BranchFaxNumber |
| Branch Country | Germany | BranchCountryName |
| Branch ID # | 234 | BranchCode |
| Branch Telephone | 1-212-555-1234 | BranchPhoneNumber |
| Branch Representative ID | 12 | LBRIDCode |
| Transaction Number | 1215199614251 | TransactionNumber |
| Currency/Amount Approved | BEF 2000 | HomeBankCurrency,<br>AmountDebited |
| Currency/Amount Dispensed | DEM 1500.23 | HomeBankCurrency,<br>AmountDispensed |
| US Dollar Amount | USD 234.23 | AmountUSD |
| Customer Account Number | 12345678890 | CustID |
| Home Bank Unit Name | Belgium | CustomerHomeBank |
| Home Bank Representative ID | 22 | CSRID |
| Home Bank Contact | Wesly Wilson | HomeBankContact |
| Home Bank Country | Belgium | HomeBank |
| Home Bank Telephone | 1-23423-2234234 | HomeBank |
| Home Bank Fax Number | 1-23423-23423 | HomeBank |

FIG. 30

Facsimile Confirming Transaction Sent to Home Bank Unit

| Title | Sample Data | Data Source |
|---|---|---|
| Sent to: | Wesly Wilson | HomeBankContact |
| At Fax: | 123123123123 | HomeBankFaxNumber |
| Date and Time: | 15 December, 1995 14:25 GMT | DateGMT TimeGMT |
| Branch Contact | Emma Richtoffen | BranchContact |
| Branch Fax Number | 123123123123 | BranchFaxNumber |
| Branch Country | Germany | BranchCountryName |
| Branch ID # | 234 | BranchCode |
| Branch Telephone | 1-212-555-1234 | BranchPhoneNumber |
| Branch Representative ID | 12 | LBRIDCode |
| Transaction Number | 1215199614251 | TransactionNumber |
| Currency/Amount Approved | BEF 2000 | HomeBankCurrency, AmountDebited |
| Currency/Amount Dispensed | DEM 1500.23 | HomeBankCurrency, AmountDispensed |
| US Dollar Amount | USD 234.23 | AmountUSD |
| Customer Account Number | 12345678890 | CustID |
| Home Bank Unit Name | Belgium | CustomerHomeBank |
| Home Bank Representative ID | 22 | CSRID |
| Home Bank Contact | Wesly Wilson | HomeBankContact |
| Home Bank Country | Belgium | HomeBank |
| Home Bank Telephone | 1-23423-2234234 | HomeBank |
| Home Bank Fax Number | 1-23423-23423 | HomeBank |

FIG. 31

Record of Confirming Facsimile Kept by System Processor

| Title | Sample Data | Data Source |
|---|---|---|
| Date and Time: | 15 December, 1995<br>14:25 GMT | DateGMT<br>TimeGMT |
| Branch Contact | Emma Richtoffen | BranchContact |
| Branch Fax Number | 123123123123 | BranchFaxNumber |
| Branch Country | Germany | BranchCountryName |
| Branch ID # | 234 | BranchCode |
| Branch Telephone | 1-212-555-1234 | BranchPhoneNumber |
| Branch Representative ID | 12 | LBRIDCode |
| Transaction Number | 1215199614251 | TransactionNumber |
| Currency/Amount Approved | BEF 2000 | HomeBankCurrency,<br>AmountDebited |
| Currency/Amount Dispensed | DEM 1500.23 | HomeBankCurrency,<br>AmountDispensed |
| US Dollar Amount | USD 234.23 | AmountUSD |
| Customer Account Number | 12345678890 | CustID |
| Home Bank Unit Name | Belgium | CustomerHomeBank |
| Home Bank Representative ID | 22 | CSRID |
| Home Bank Contact | Wesly Wilson | HomeBankContact |
| Home Bank Country | Belgium | HomeBank |
| Home Bank Telephone | 1-23423-2234234 | HomeBank |
| Home Bank Fax Number | 1-23423-23423 | HomeBank |

FIG. 32

Facsimile Log Database

| Field Name | Description | Example |
|---|---|---|
| FaxID | 2 digit code | 12 |
| DocumentName | string up to 12 characters | 123456.TXT or 05291345.826 |
| TransactionNo | 6 digits | 123456 (0 for report fax) |
| SendToName | string up to 50 characters | Jefferson Davis Doe |
| SendToNumber | 18 digits | 3103145307 |
| Status | 1 digit | 0 (new) 1 (queued) 2 (failed) 3 sent) |
| Qtime | string up to 20 characters | 5/29/95 5:00:02 PM |
| Tries | 2 digits | 3 |
| ErrorCode | 1 digit | 0 (OK) |

FIG. 33

Buy-Sell rates (to the dollar)

| TO | Buy | Sell |
|---|---|---|
| USD | 1 | 1 |
| DEM | 1.6525 | 1.6825 |
| FFR | 5.825 | 5.885 |
| GBP | 0.6761 | 0.6821 |
| ESP | 133.5 | 134.5 |
| BEF | 36.12 | 36.46 |
| JPY | 98.5 | 97.7 |

FIG. 34

Rates per 1 dispense currency

| IN | | USD | DEM | FFR | GBP | ESP | BEF | JPY |
|---|---|---|---|---|---|---|---|---|
| | | 1 | 1.683 | 5.885 | 0.682 | 134.5 | 36.46 | 99.7 |
| USD | | 1 | 1.6825 | 5.885 | 0.6821 | 134.5 | 36.46 | 99.7 |
| DEM | 1.653 | 0.6051 | 1.018 | 3.5613 | 0.4128 | 81.392 | 22.064 | 60.333 |
| FFR | 5.825 | 0.1717 | 0.2888 | 1.01 | 0.1171 | 23.09 | 6.2592 | 17.116 |
| GBP | 0.676 | 1.4791 | 2.4885 | 8.7043 | 1.009 | 198.94 | 53.927 | 147.46 |
| ESP | 133.5 | 0.0075 | 0.0126 | 0.0441 | 0.0051 | 1.007 | 0.2731 | 0.7468 |
| BEF | 36.12 | 0.0277 | 0.0466 | 0.1629 | 0.0189 | 3.7237 | 1.009 | 2.7602 |
| JPY | 98.5 | 0.0102 | 0.0171 | 0.0597 | 0.0069 | 1.3655 | 0.3702 | 1.012 |

Customer of

FIG. 35

Rates per 1 home bank currency

| IN | USD | DEM | FFR | GBP | ESP | BEF | JPY |
|---|---|---|---|---|---|---|---|
| USD | 1 | 0.5944 | 0.1699 | 1.4661 | 0.0074 | 0.0274 | 0.01 |
| DEM | 1.6525 | 0.982 | 0.2808 | 2.4227 | 0.0123 | 0.0453 | 0.0166 |
| FFR | 5.825 | 3.4621 | 0.99 | 8.5398 | 0.0433 | 0.1598 | 0.0584 |
| GBP | 0.6761 | 0.4018 | 0.1149 | 0.991 | 0.005 | 0.0185 | 0.0068 |
| ESP | 133.5 | 79.346 | 22.685 | 195.72 | 0.993 | 3.6615 | 1.339 |
| BEF | 36.12 | 21.468 | 6.1376 | 52.954 | 0.2686 | 0.991 | 0.3623 |
| JPY | 98.5 | 58.544 | 16.737 | 144.41 | 0.7323 | 2.7016 | 0.988 |

Customer of

AUTOMATED MULTILINGUAL INTERACTIVE SYSTEM AND METHOD TO PERFORM FINANCIAL TRANSACTIONS

NOTICE OF COPYRIGHTED MATERIAL IN DISCLOSURE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

Reference is made to co-pending application entitled "INTEGRATED FULL SERVICE CONSUMER BANKING SYSTEM AND SYSTEM AND METHOD FOR OPENING AN ACCOUNT," Ser. No. 08/473,975, filed Jun. 7, 1995 (Attorney Docket No. 107045.003); co-pending application entitled "METHOD AND SYSTEM FOR PROVIDING INTEGRATED BROKERAGE AND OTHER FINANCIAL SERVICES THROUGH CUSTOMER ACTIVATED TERMINALS," Ser. No. 08/483,710, filed Jun. 7, 1995 (Attorney Docket No. 107045.004); and co-pending application entitled "A CUSTOMER-DIRECTED, AUTOMATED SYSTEM FOR TRANSFERRING FUNDS BETWEEN ACCOUNTS," Ser. No. 08/505,886, filed Jul. 24, 1995 (Attorney Docket No. 107045.019). Now U.S. Pat. No. 5,659,165 the disclosures of which are incorporated by reference herein.

FIELD OF THE INVENTION

This invention relates to a telephone based interactive system to perform financial transactions in multiple languages. For example, the present invention relates to an automated system and method for enabling a customer to use a preferred language to perform financial transactions in a bank branch where no individual speaks the customer's preferred language.

BACKGROUND OF THE INVENTION

As financial institutions compete to provide a global presence and as international travel increases, banks with locations in a number of countries are increasingly exposed to "language barrier" problems from customers while on travel attempting to perform financial transactions at a bank branch where no bank employee speaks the customer's language.

For example, a local branch representative may have a customer in his or her branch from another country who has either lost his or her ATM card, or the customer's card does not work for some reason, or there is another problem. Unfortunately, the local branch representative has no record of the customer on the branch's computers, because the computer systems of the different branches in different countries may not be directly or automatically linked. Thus, the local branch representative may not be able to access the customer's account with an on-line system. Moreover, the branch representative may not even be able to communicate with the customer. And if the customer needs emergency cash, the problem may be exacerbated because the customer may be frustrated by the customer's apparent inability to obtain cash from a branch of the customer's bank. As banks compete on an international level, the ability to service a wide range of languages used by travelling customers is becoming more important.

Currently, the local branch representative can spend quite a while on a single problem resolution. Training staff is expensive and difficult with the current manual procedures. Also, since problem resolution sometimes requires multiple international calls and faxes, the telecommunications transactional cost is high. Finally, because the customer with the problem is not the local branch representative's customer, the local branch representative gets no revenue for resolving the problem.

Current procedures include a list of persons with various language skills and their phone numbers. If the local branch representative cannot understand what the customer is trying to communicate, the branch representative will take a guess what languages the customer speaks, access the resource list to see who can speak the language needed, and then attempt to contact the translator locally.

The branch representative may then attempt to contact the customer's home bank. But there may not be someone there who speaks the local branch representative's language. For example, if the local bank is in the U.S., and the customer is Japanese, it is problematic that there would be someone in the U.S. local bank who speaks Japanese. Moreover, if a German traveler has a problem and goes to a Japanese branch, the transaction must usually be settled in English, which is not particularly convenient for the local Japanese branch representative, the customer, or the German home bank branch.

From the customer's point of view, if support for resolving the customer's problem is not possible, let alone timely, the customer may feel that the bank's promise of global banking is hollow. In addition, in an emergency, the customer's ability to get to an affiliated branch may have entailed considerable effort in itself, thus potentially increasing the customer's dissatisfaction.

Further, the dispensing branch may have difficulty getting re-imbursed by the customer's home bank, because this is a manual procedure and there is no centralized record keeping. The only existing records are the facsimile messages sent back and forth, and if a facsimile message gets lost, there is no audit trail.

A final complication to the manual problem is the foreign exchange rate. For a U.S.-based multinational bank, the current method may require both the home bank branch representative and the local bank branch staff to perform manual calculations, first from the dispensing branch's currency to the U.S. dollar, then from the home bank branch currency to the U.S. dollar. This is time consuming and may be a source of errors.

SUMMARY OF THE INVENTION

It is an object of the present invention to overcome the shortcomings discussed above with an automated system and method to assist translation between the local branch representative, the customer, and the customer's home bank customer service representative. The system according to the invention enables the branch representative to effect the financial transaction through a single telephone call.

The present invention assists travelling bank customers around the world. It is a tool which reduces language barriers by providing voice response in multiple languages making service easier for both customers and staff. In addition, the application begins to automate transactions which are now manually processed, and prone to error.

The invention includes a central Interactive Voice Response (IVR) computer system which can be called and used by any location having a touch tone telephone and the appropriate access codes. This system can identify a customer's language through a series of prompts and, if necessary, establish the country in which their home bank account is maintained. It can then offer a list of services to the customer and translate their request for local staff, connect them to their home bank or offer recorded or "fax-back" information services, as required.

The branch representative activates the system with a phone call, then inputs his or her password. From the password the system validates the branch representative and also identifies the branch representative's name, preferred language, country and currency, and facsimile and telephone numbers from a database. The system then prompts the representative to determine if the customer has shown identification. The system then requests the branch representative to give the telephone to the customer.

The system then prompts the customer in various languages. The customer's response to the prompts identifies the customer's preferred language and in response to other prompts the location of the customer's home bank. The system then places a call to that home bank's customer service representative who has teller-type access to the customer's home bank account and may also speak the customer's language. The system also identifies the currency of the home bank branch and the appropriate exchange rates.

The system then "bridges" the two telephone calls so that the customer service representative communicates directly with the customer. The customer service representative then identifies and validates the customer by asking the customer for some private information. The service representative is requested by the system whether the customer service representative will authorize the financial transaction requested by the customer, such as an emergency cash advance.

If the customer representative authorizes an emergency cash advance, the system will then ask which currency and what amount the customer representative wishes to authorize. The system then asks the local branch representative in his or her preferred language to co-authorize the advance. The branch representative is also given the option of speaking to the customer representative.

If the transaction, for example, an emergency cash advance, is approved by the branch representative and customer representative, the cash is dispensed to the customer. A confirming facsimile record is sent to the local branch and the customer representative and a weekly report is sent to all involved businesses summarizing all transactions involving their customers and branches. Further, pertinent databases are updated.

The system is further designed so that it is accessible to customers and branch representatives having no special expertise in computers and the like.

Further, the system is designed so that it can be accessed by a standard touch-tone telephone.

Also, the system is provided with various safeguards to assure that only authorized individuals have access to the financial information and transactions involved.

BRIEF DESCRIPTION OF THE DRAWINGS

FIG. 24 is the format of the Branches database which is used to look up Branch location information such as country, phone numbers, address, language spoken, and currency used.

FIG. 25 is the format of the Home Bank Telephone Call Centers database which is used to look up Home Bank Center location information such as country, phone numbers, address, language spoken, and currency used.

FIG. 26 is the format of the Businesses which is the source of business fax number and other information used during transaction summary report generation.

FIG. 27 is the format of the Transaction Log database which tracks the detailed information for all financial transactions performed.

FIG. 28 is a sample report format of the Summary of Transactions which is generated each week by combining information from the Businesses database and the Transaction Log database and summarizes the activity of emergency cash transactions processed for each business location.

FIG. 29 is a sample of the information titles, example information, and database field source that will be formatted onto the confirmation facsimile sent to the Local Branch Representative.

FIG. 30 is a sample of the information titles, example information, and database field source that will be formatted onto the confirmation facsimile sent to the Home Bank Customer Service Representative.

FIG. 31 is a sample of the information titles, example information, and database field source that will be formatted onto the confirmation facsimile to be kept on record by the Financial Transaction application.

FIG. 32 is the format of the Facsimile Log tracking database.

FIG. 33 is the format of the spreadsheet table that maintains the look up source for currency buy and sell rates to the dollar.

FIG. 34 is the format of the spreadsheet table look up source for currency exchange rates per 1 Dispense Currency.

FIG. 35 is the format of the spreadsheet table look up source for currency exchange rates per 1 Home Bank Currency.

DETAILED DESCRIPTION OF THE PREFERRED EMBODIMENT

Figure 1:
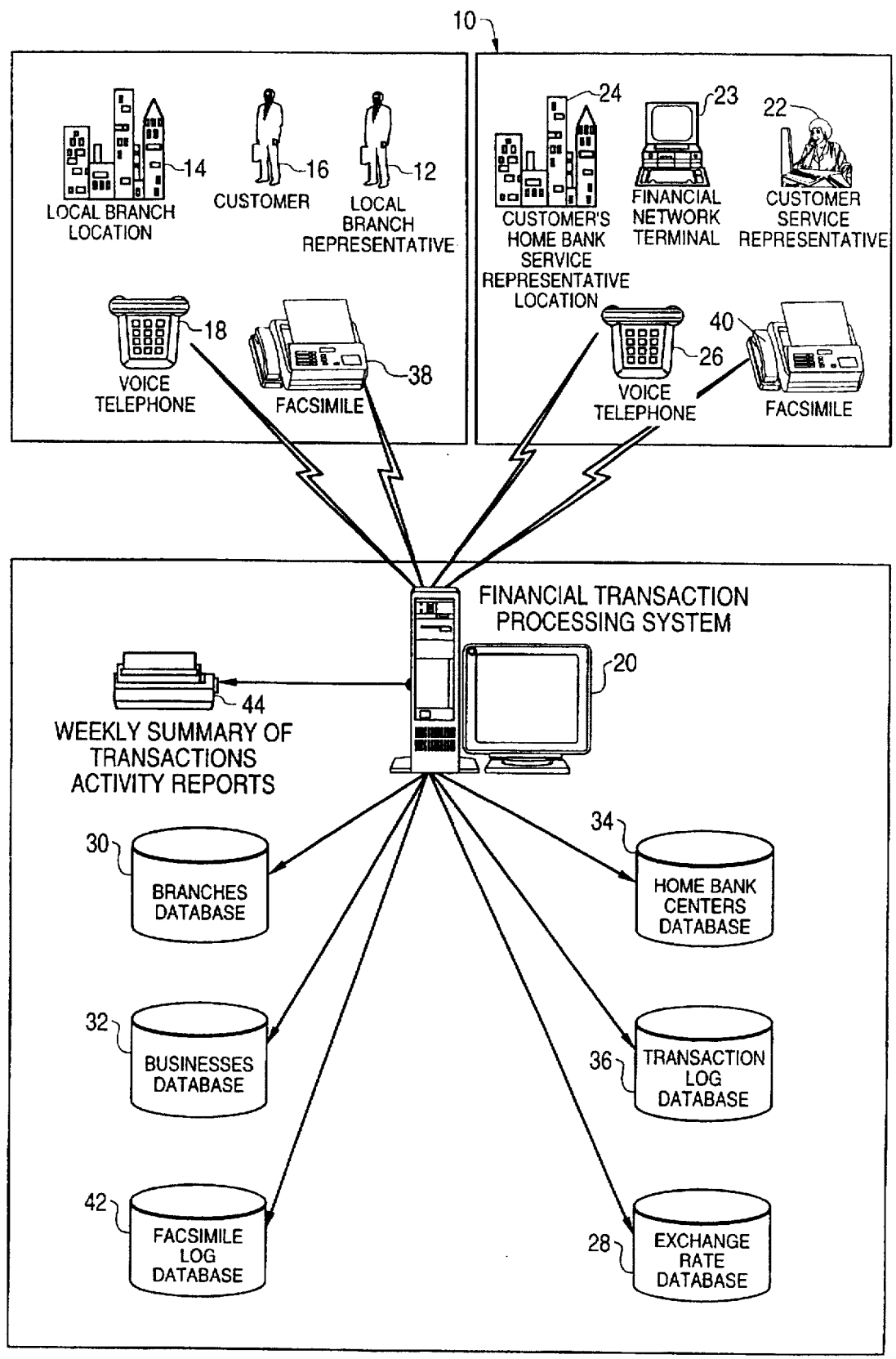
FIG. 1 is an overview block diagram of the integrated components and communication links of the financial transaction processing system of the present invention.

FIG. 1 is a schematic block diagram showing an overview of a system 10 according to the present invention. The system 10 is initialized by an incoming telephone call from a Local Branch Representative (LBR) 12 in a local branch location 14 who has a customer 16 from a branch office different from the local branch office 14. The customer 16 has a financial need, such as emergency cash, which the customer 16 is unable to communicate verbally to the representative 12 because they do not speak a common language. The representative 12 places the call through a voice telephone 18 at the local branch location 14 to the financial transaction processing system 20. The system 20 includes a telephone based interactive voice response application designed to provide multiple language assisted translation to effect a customer's financial requests, such as an emergency case request. In response to the call, the system 20 then processes prompted responses from the representative 12 to verify the identity of the representative 12 and the location of the local branch location 14. The system 20 then requests the representative 12 to give the telephone 18 to the customer 16.

The customer 16 then communicates with the system 20 through the telephone 18. Through prompted responses the language spoken by the customer 16 is identified. Also, the customer's home bank location (not shown) is identified as well as a corresponding customer service representative 22 located in the customer's home bank service representative location 24. Because the representative 22 is affiliated with the home branch of the customer 16, the representative 22 and the customer 16 speak the same language. Further, the representative 22 has teller-type access to the account of the customer 16 through financial network terminal 23 hooked up to the bank's financial system (not shown). The system 20 then contacts the representative 22 via telephone 26 and the representative 22, through prompted responses, verifies his or her identity. The system 20 then places the representative 22 in direct telephonic contact with the customer 16. During this conversation, the representative 22 verifies the identity of the customer 16 by soliciting private information (e.g., mother's maiden name, social security number, etc.). Once the customer 16 is verified, the representative 22 then finds out what type of financial transaction the customer 16 requires. The representative 22 then informs the system 20 about the nature of the requested financial transaction.

The system 20 then asks the representative 22 if, based upon the telephonic information from the customer 16 and the status of the account of the customer 16, the representative 22 will authorize the requested financial transaction, such as an emergency cash transaction amount. In generating this inquiry, the system 20 may access an exchange rate database 28. If the representative 22 authorizes the emergency cash transaction to the system 20, the system 20, in turn, prompts the representative 12 to seek the authorization of the representative 12. If the representative 12 also authorizes the financial transaction such as an emergency cash transaction: (1) the customer 16 is given cash from the local branch location 14; (2) the system 20 will record the transaction information in the transaction log database 36; (3) the system 20 will send confirming facsimiles of the transaction with all pertinent information to the facsimile machine 38 in the local branch location 14 and the facsimile machine 40 in the representative's location 24, and further the facsimile log database 42 is updated; and (4) the system will generate a summary of transactions activity report 44 on a periodic basis (such as weekly). In this way the financial transaction is authorized and proper record keeping is achieved.

Figure 2:
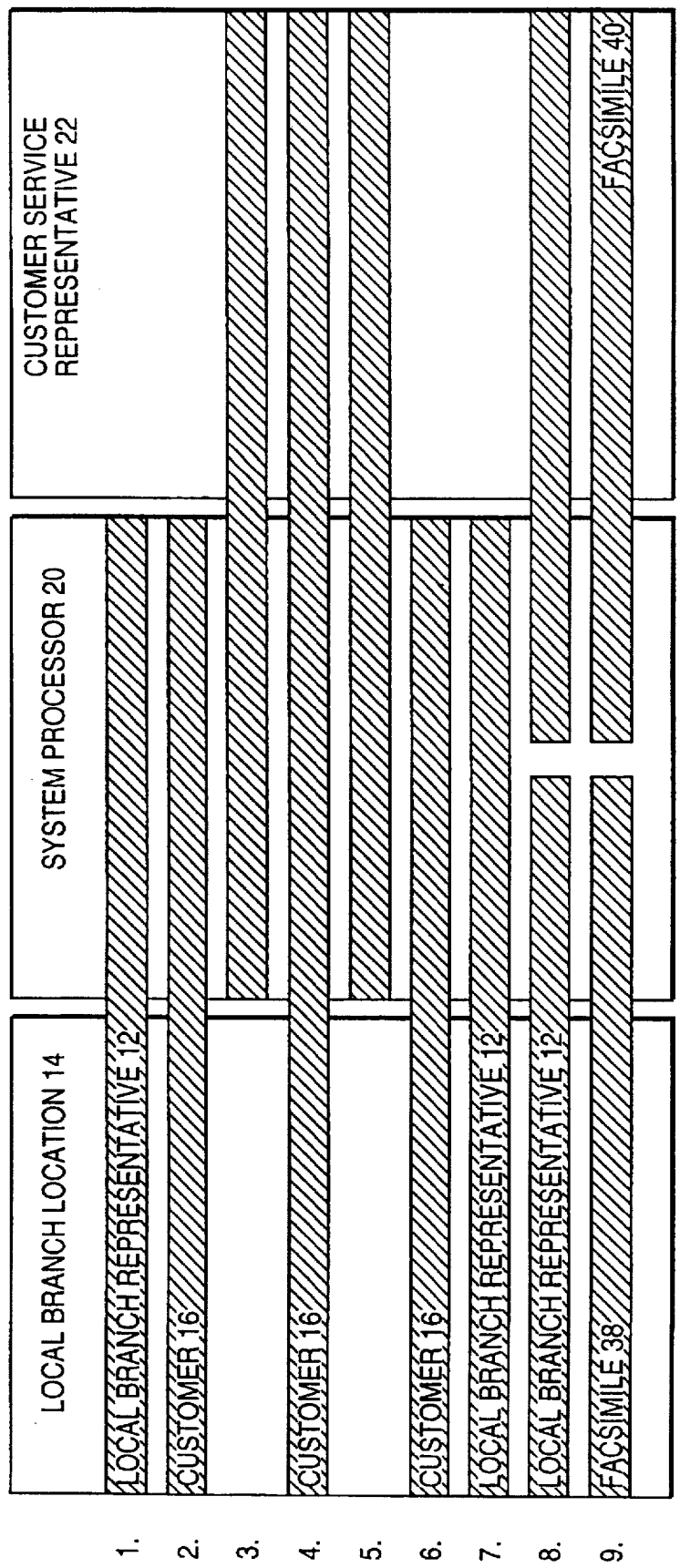
FIG. 2 is a bar chart illustrating the communication connections which occur during the financial transaction processing.

A more specific description of the interface between the system processor 20 and the local branch representative 12, the customer 16 and the representative 22 is shown in FIG. 2.

As shown in FIG. 2, the following steps are performed in the system:

1. Branch Representative 12—System Processor 20

The processor 20 greets the branch representative 12 and prompts (in multiple languages-i.e. English, Spanish, French, Japanese) for an identification to be entered.

The branch representative 12 enters a ten character identification followed by the star key. The identification consists of: a 3 character country code, followed by a 5 character branch code, followed by a 2 character personal identification code.

The system processor 20 validates the country and branch codes and switches to the language of the branch representative 12 based on the country code entered.

The system processor 20 asks if valid identification (passport or other photo identification) has been presented by the customer 16. The representative 12 is also given the choice of asking the customer 16 for identification at this time (if not done previously).

The branch representative 12 gives the phone 18 to the customer 16 and pushes 1 when the customer 16 is ready.

2. Customer 16—System Processor 20

The customer 16 chooses a language to speak from the system processor 20 "menu".

The customer 16 identifies the location of his or her "home" bank via a dialogue with the processor 20.

The customer 16 is told to wait and placed on hold by the processor 20.

3. Processor 20—Service Representative 22

The processor 20 calls the customer's "home" service representative 22.

The processor 20 greets the representative 22.

The representative 22 is asked for a 2 character identification and the processor 20 records it for MIS purposes only.

The processor 20 explains the customer situation to the representative 22 (including whether identification/passport information has been presented).

On request, the processor 20 provides the representative 22 with foreign exchange rate information (ICC rates). This information is retrieved by the processor 20 from a rate table 28 stored in the processor 20.

The processor 20 instructs the customer representative 22 to speak to the customer 16.

The processor 20 informs the representative 22 how to re-connect with the processor 20 at the end of the customer dialogue.

4. Customer 16—Representative 22

The processor 20 "bridges" the representative 22 and the customer 16.

The representative 22 greets the customer 16 and offers assistance.

The representative 22 explains, for example, the Emergency Cash process to the customer 16.

The representative 22 authenticates the customer 16 using appropriate procedures.

The representative 22 and customer 16 determine the amount of cash to be dispensed to the customer 16. This determination can be either in the customer's "home" currency or in the currency of the local branch 14.

The representative 22 can tell the customer 16 the indicative amounts that will be debited from the customer's account and how much will be dispensed in the local branch 14.

The representative 22 tells the customer 16 that they he or she will be placed on hold and to wait.

5. Representative 22—Processor 20

The representative 22 indicates to the processor 20 that the transaction is ready to be approved.

The representative 22 enters the customer's account number and the amount of the transaction in either the "home" or local branch 14 currency.

The processor 20 calculates amounts to be transferred and re-caps the transaction in "home," local branch 14 and U.S. dollar equivalents.

The processor 20 tells the representative 22 that he or she will be placed on hold and to wait.

6. Processor 20—Customer 16

Processor 20 instructs the customer 16 to give the phone 18 back to the representative 12.

7. Processor 20—Branch Representative 12

Processor 20 asks 'If you are the branch representative press 1 now.'

Processor 20 tells the branch representative 12 the details of the transaction.

Processor 20 asks the branch representative 12 'If you want to perform the requested transaction press 1 now.' The branch representative is also given the choice of re-connecting to the representative 22 if there is a problem.

8. Processor 20—Branch representative 12/Processor 20—Customer Representative 22

If the transaction is confirmed, the processor 20 confirms the transaction with both the branch representative 12 and the customer representative 22.

The processor 20 also informs both that a confirming facsimile will be sent to each location.

The processor 20 terminates all calls.

9. Processor 20—Facsimile 38/Processor 20—Facsimile 40

The processor 20 confirms the transaction details by fax to both the local branch facsimile 38 and the customer representative facsimile 40. Pertinent data bases are also updated. Additional reports may be sent via facsimile to a telephone center associated with the local country. Further, weekly reports may be generated for business managers associated with the local country and home country to aid in record keeping and proper settlement of accounts. Further, for each transaction a "transaction ticket" may be generated- and sent via facsimile. Each transaction ticket contains information regarding the transaction such as account numbers, branch identifications, currency exchange rates and amounts of the transaction.

Figure 3:
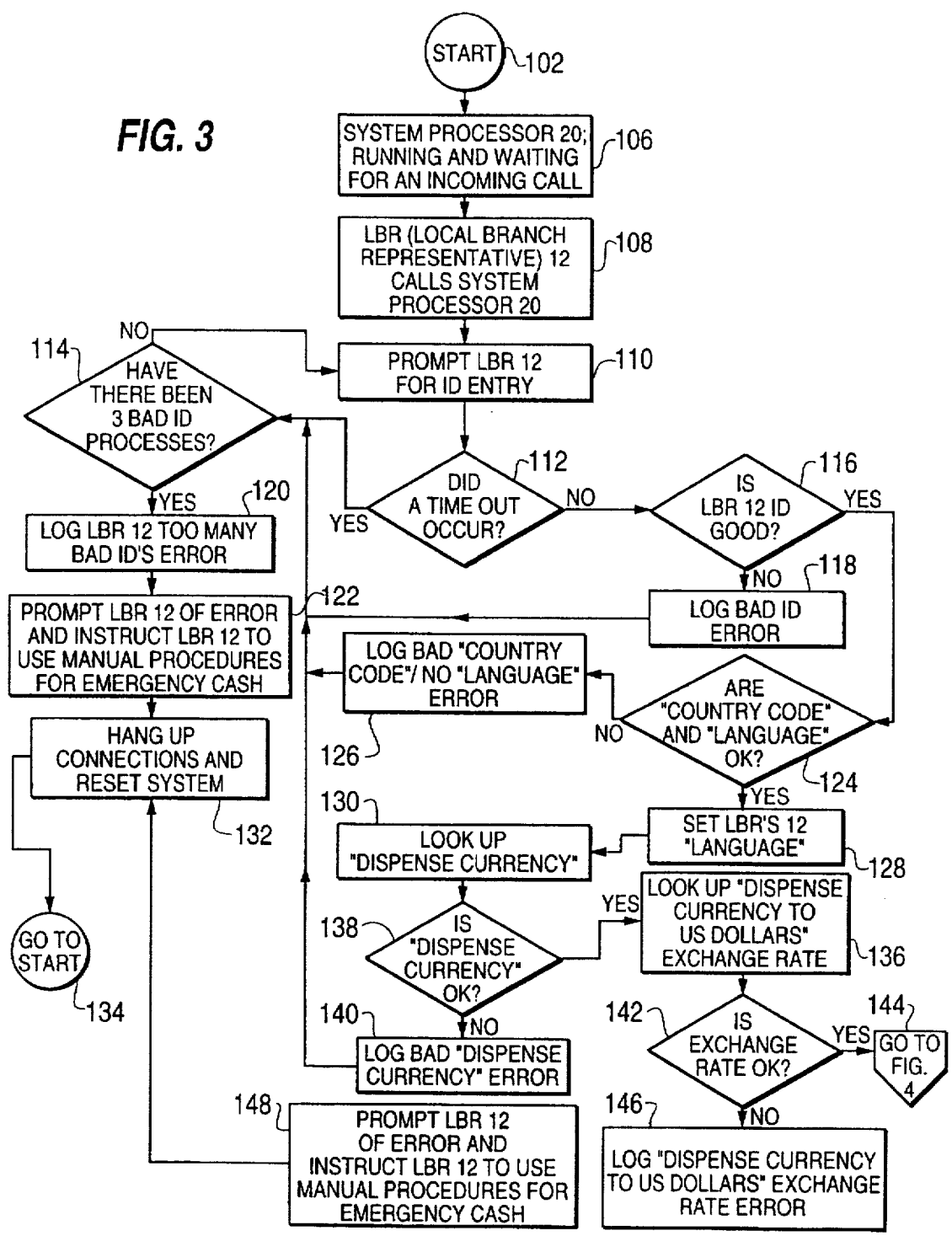
FIG. 3 is the processing flow diagram for the Financial Transaction application, including the Local Branch Representative's (LBR) login to the system and the verification process.

The emergency cash transaction processing performed by the Financial Transaction Processing System (FIG. 1) is symbolically flow charted beginning with FIG. 3 at block 102. The voice prompt and response application will wait idle for an incoming call (block 106).

A Local Branch Representative (LBR 12), with a customer 16 in need of emergency cash, will make a call to system processor 20 (block 108). Once the system processor 20 answers the incoming call, the LBR 12 is prompted for entry of their identification password (block 110).

If a time out occurred while waiting for an identification entry (YES branch from block 112), the system determines if there have been three bad identification processes (block 114). If the count of bad identification processes has not exceeded three (NO branch from block 114), the LBR 12 will be reprompted for an identification password entry (block 110). If three bad identification processes have been encountered (YES branch from block 114), the system will log an error (block 120), prompt the LBR 12 that an error has occurred and instruct them to use manual procedures for providing the customer 16 with emergency cash (block 122). The system processor 20 will now hang up all connections and reset (block 132), then loop back to block 102 and restart its process (block 134).

If a time out is not detected (NO branch from block 112), the identification entered is verified (block 116). If the identification is not valid (NO branch from block 116), a bad identification error is recorded (block 118). The system will now branch to block 114 where it will process the error as previously documented.

If the identification is good (YES branch from block 116), the country code and language portion of the identification is verified (block 124). If the country code and language do not verify (NO branch from block 124), a bad country code error is recorded (block 126). The system will now branch to block 114 where it will process the error as previously documented. When a good country code is validated (YES branch from block 124), the language that the system processor 20 uses to prompt the LBR 12 is set to the language matching the country code (block 128).

The system processor 20 now uses the country code to perform a look up of the LBR 12's dispense currency (block 130). This look up is performed with in the Branches Database file 30; this file's storage format is diagrammed on FIG. 24. All other branch identification information is retrieved from this file. The dispense currency is then verified (block 138). If the currency fails verification (NO branch from block 138), a bad dispense currency error is recorded (block 140). The system will now branch to block 114 where it will process the error as previously documented. If the dispense currency verifies (YES branch from block 138), a look up for the dispense currency to US dollars exchange rate is performed (block 136). The exchange rate look ups are performed within tables maintained in exchange rate database 28 in the spreadsheet formats diagrammed on FIGS. 33, 34 and 35

This exchange rate is then verified (block 142). If the rate does not verify (NO branch from block 142), a no exchange rate error is recorded (block 146). Next, the LBR 12 is prompted to use manual procedures for providing the customer 16 with emergency cash (block 148). The system processor 20 will now hang up all connections and reset (block 132), then loop back to block 102 and restart its process (block 134).

Figure 4:
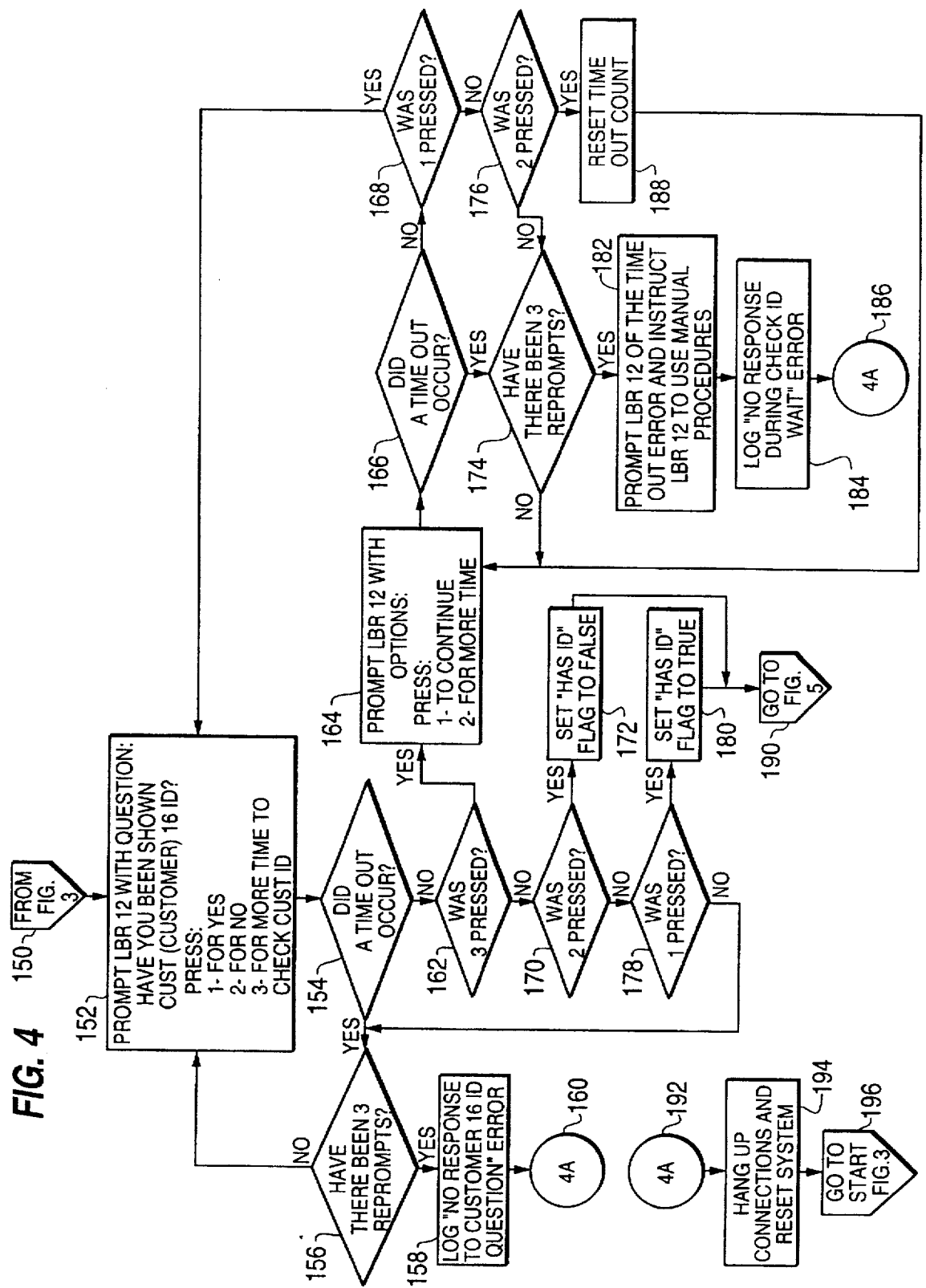
FIG. 4 diagrams the verification of the customer's identification.

If the exchange rate is good (YES branch from block 142), the LBR 12 is asked if they have been shown customer 16 identification (FIG. 4 block 152). Choices of press one for yes, press two for no, and press three for more time to ask customer 16 for identification are presented after this question. If a time out occurred while waiting for a response (YES branch from block 154), a test for three reprompts of the question is performed (block 156). If there have not been three reprompts (NO branch from block 156), the question is asked again (block 152). After three reprompts (YES branch from block 156), a no response error is recorded (block 158). The system processor 20 will now hang up all connections and reset (block 194), then loop back to block 102 and restart its process (block 196). If a time out did not occur (NO branch from block 154) and an invalid response was entered (NO branch from block 162, 170 and 178), the process will branch to block 156 and test for a reprompt as previously documented.

On a response of three to block 152 (YES branch from block 162), the LBR 12 is prompted with the options: press one to continue and press two for more time (block 164). If a time out occurred while waiting for a response (YES branch from block 166), a test for three reprompts of the question is performed (block 174). If there have not been three reprompts (NO branch from block 174), the options are prompted again (block 164). After three reprompts (YES branch from block 174), the LBR 12 is notified of an error, instructed to use manual procedures for providing emergency cash (block 182) and a no response error is recorded (block 184). The system processor 20 will now hang up all connections and reset (block 194), then loop back to block 102 and restart its process (block 196). If a time out did not occur (NO branch from block 166) and an invalid response was entered (NO branch from block 168 and 176), the process will branch to block 174 and test for a reprompt as previously documented. If two was pressed in response to block 164 (YES branch from block 176), the time out count for block 164 is reset (block 188) and the options are reprompted (block 164). If one was pressed (YES branch from block 168), the customer 16 identification question (block 152) is reprompted.

On a response of two to block 152 (YES branch from block 170), a system flag is set to record that the customer 16 has not shown identification (block 172). If one was pressed (YES branch from block 178), the system flag will record that the customer 16 has shown identification (block 180).

Figure 5:
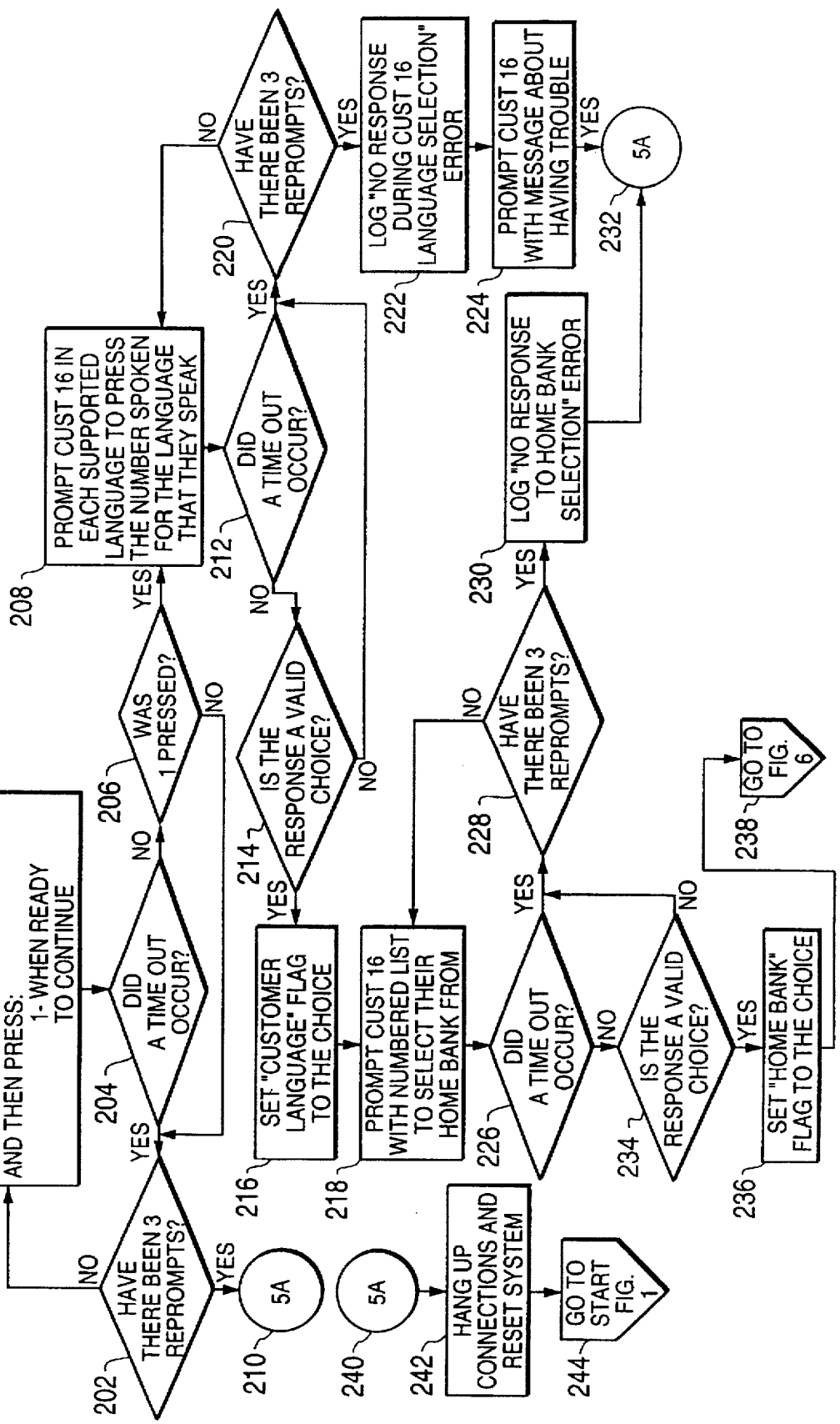
FIG. 5 diagrams the customer's interaction to identify the customer's language and home bank.

The system will now prompt the LBR 12 to transfer the telephone to the customer 16 and press one when ready to continue (FIG. 5 block 200). If a time out occurred (YES branch from block 204), a test for three reprompts is performed (block 202). If there have not been three reprompts (NO branch from block 202), the instructions are prompted again (block 200). After three reprompts (YES branch from block 202), the system processor 20 will hang up all connections and reset (block 242), then loop back to block 102 and restart its process (block 244). If a time out did not occur (NO branch from block 204) and a key press of one was not entered (NO branch from block 206), the process will branch to block 202 and test for a reprompt as previously documented.

When one is pressed (YES branch from block 206), the customer 16 is prompted with numbered list of language choices, each spoken in the language of that choice, and the customer 16 is asked to press the number spoken for the language that they speak (block 208). If a time out occurred (YES branch from block 212), a test for three reprompts is performed (block 220). If there have not been three reprompts (NO branch from block 220), the language choices are prompted again (block 208). After three reprompts (YES branch from block 220), a no response during language selection error is recorded (block 222) and the customer 16 is notified of the trouble (block 224). The system processor 20 will now hang up all connections and reset (block 242), then loop back to block 102 and restart its process (block 244). If a time out did not occur (NO branch from block 212) and a valid language key press was not entered (NO branch from block 214), the process will branch to block 220 and test for a reprompt as previously documented. After a valid language selection (YES branch from block 214), a system flag is set to record the language used to speak to the customer 16(block 216).

The customer 16 is now prompted with a list of home bank countries and locations from which they are asked to select the one where they have an account (block 218). If a time out occurred (YES branch from block 226), a test for three reprompts is performed (block 228). If there have not been three reprompts (NO branch from block 228), the home bank choices are prompted again (block 218). After three reprompts (YES branch from block 228), a no response during home bank selection error is recorded (block 230). The system processor 20 will now hang up all connections and reset (block 242), then loop back to block 102 and restart its process (block 244). If a time out did not occur (NO branch from block 226) and a valid home bank key press was not entered (NO branch from block 234), the process will branch to block 228 and test for a reprompt as previously documented. After a valid home bank selection (YES branch from block 234), a system flag is set to record the customer's home bank selection (block 236).

Figure 6:
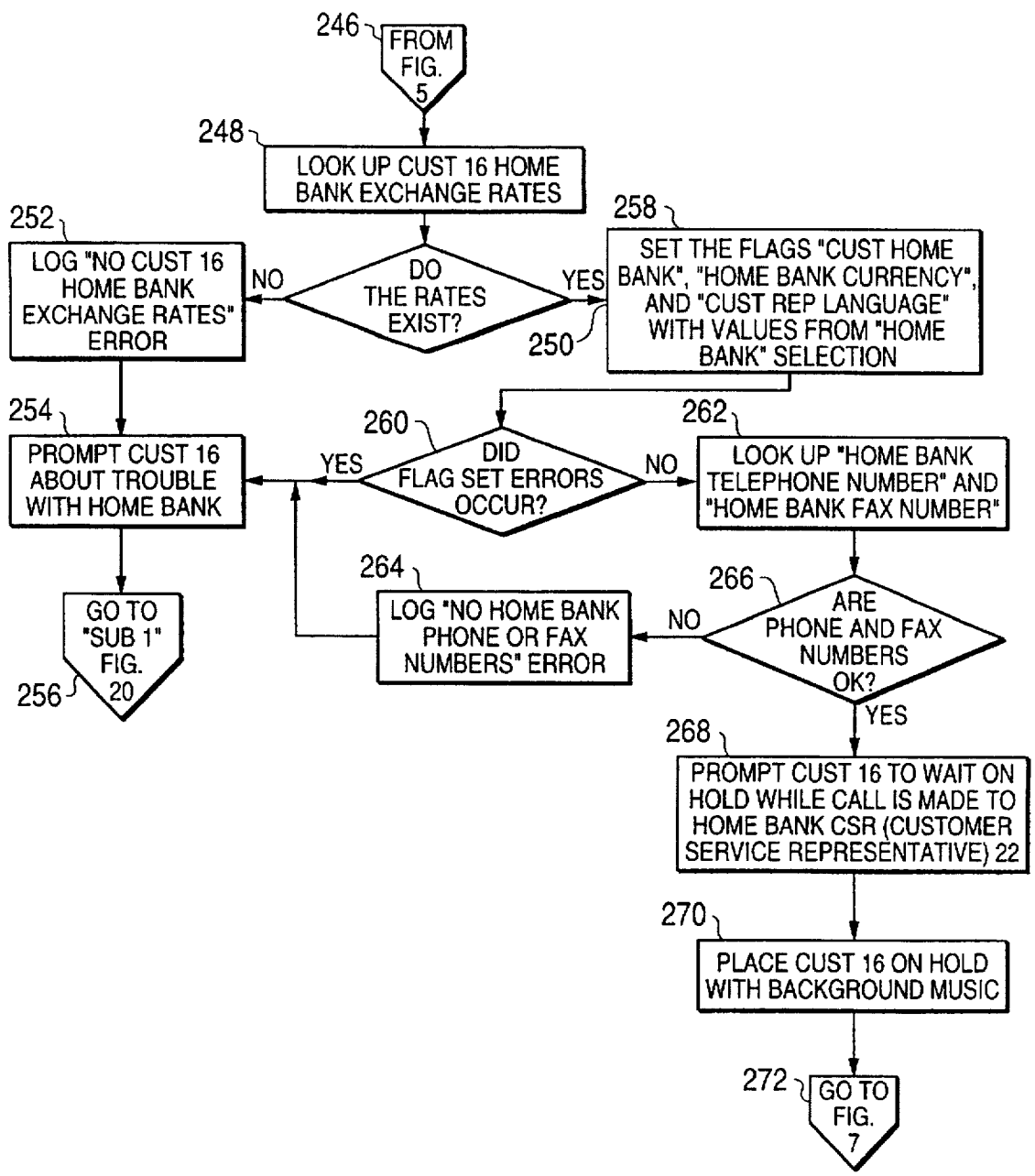
FIG. 6 diagrams the home bank verification.

Using the home bank selection, a look up of home bank exchange rates is performed (FIG. 6 block 248). If the look up fails (NO branch from block 250), a no exchange rates error is recorded (block 252). The system notifies the customer 16 of the error (block 254) and processing will branch to a common error subroutine (FIG. 20 block 666).

Figure 20:
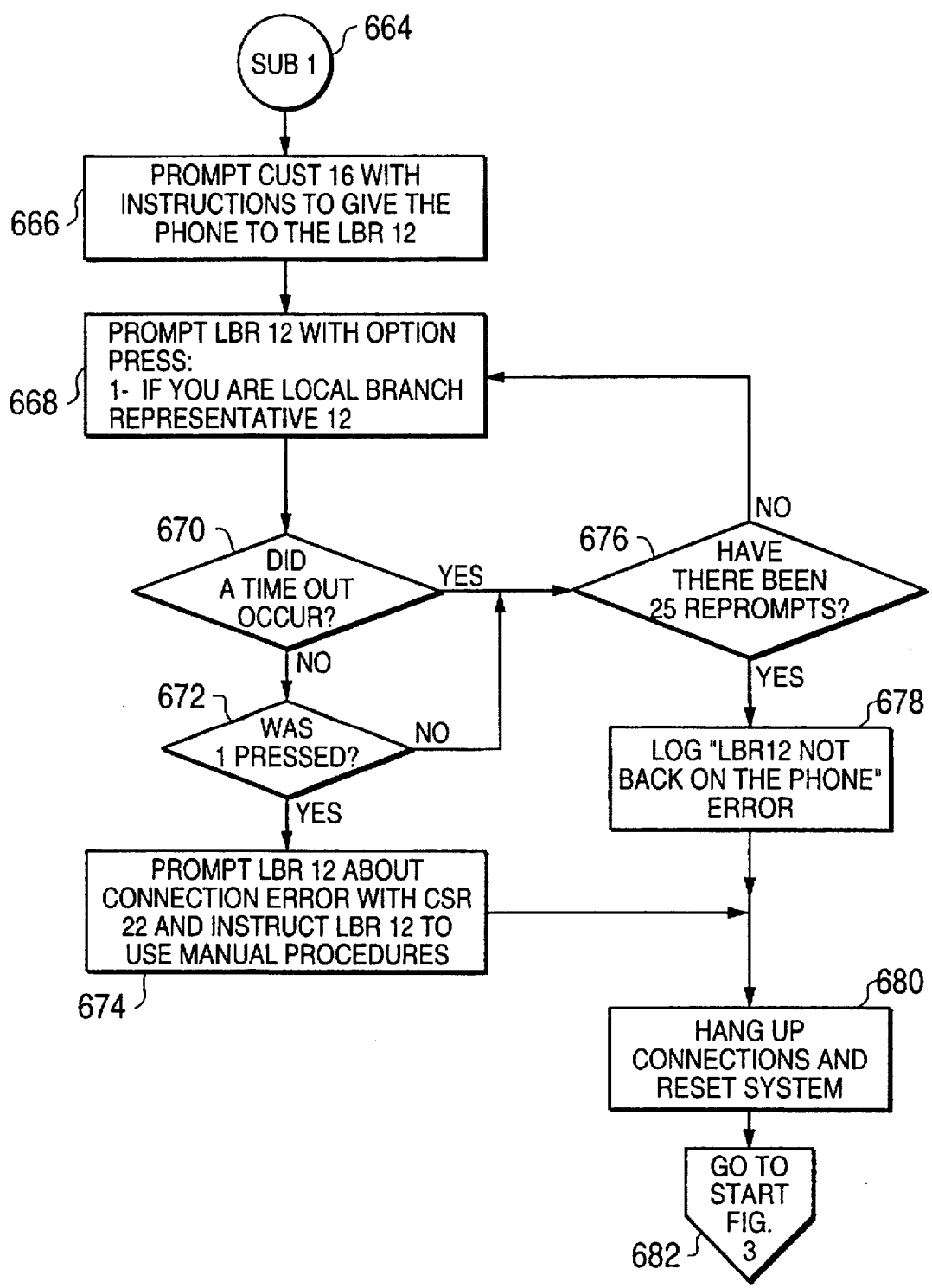
FIG. 20 is a flow chart of the process to inform the LBR of any connection trouble that has been detected during the processing.

A common subroutine used to notify the LBR 12 of a connection error begins by prompting the customer 16 with instructions to give the phone to the LBR 12 (FIG. 20 block 666). A prompt is now given which asks the LBR 12 to press one when they are on the telephone (block 668). If a time out occurred (YES branch from block 670), a test for twenty five reprompts is performed (block 676). If there have not been twenty five reprompts (NO branch from block 676), the press one prompt is repeated (block 668). After twenty five reprompts (YES branch from block 678), an LBR 12 did not return error is recorded (block 678). The system processor will now hang up all connections and reset (block 680), then loop back to block 102 and restart its process (block 682). If a time out did not occur (NO branch from block 670) and a key press of one was not entered (NO branch from block 672), the process will branch to block 676 and test for a reprompt as previously documented. After a key press of one (YES branch from block 672), the LBR 12 is notified of the connection error and instructed to use manual procedures for providing emergency cash (block 674). The system processor 20 will now hang up all connections and reset (block 680), then loop back to block 102 and restart its process (block 682).

With a successful look up of rates in block 248 (YES branch from block 250), system flags are set to record the customer's home bank location, the home bank currency and the home bank Customer 16 Service Representative's (CSR 22) language (block 258). The processor 20 also confirms that the home bank country and local branch country are, in fact, different countries. If any errors occurred during the flag setting (YES branch from block 260), the system will branch to block 254 and process the error as previously documented. If no errors occurred (NO branch from block 260), a look up of the home bank center's telephone and facsimile numbers is performed (block 262). This look up is performed within the Home Bank Centers Database file 34 (FIG. 25); this file is diagrammed on FIG. 25. If the phone and facsimile numbers do not verify (NO branch from block 266), a no home bank telephone or facsimile numbers error is recorded (block 264) and the system will branch to block 254 and process the error as previously documented. If the numbers look up is successful (YES branch from block 266), the customer 16 is prompted to wait on hold while a call is made to the home bank CSR 22 (block 268). The customer 16 is now placed on hold with background music (block 270).

Figure 7:
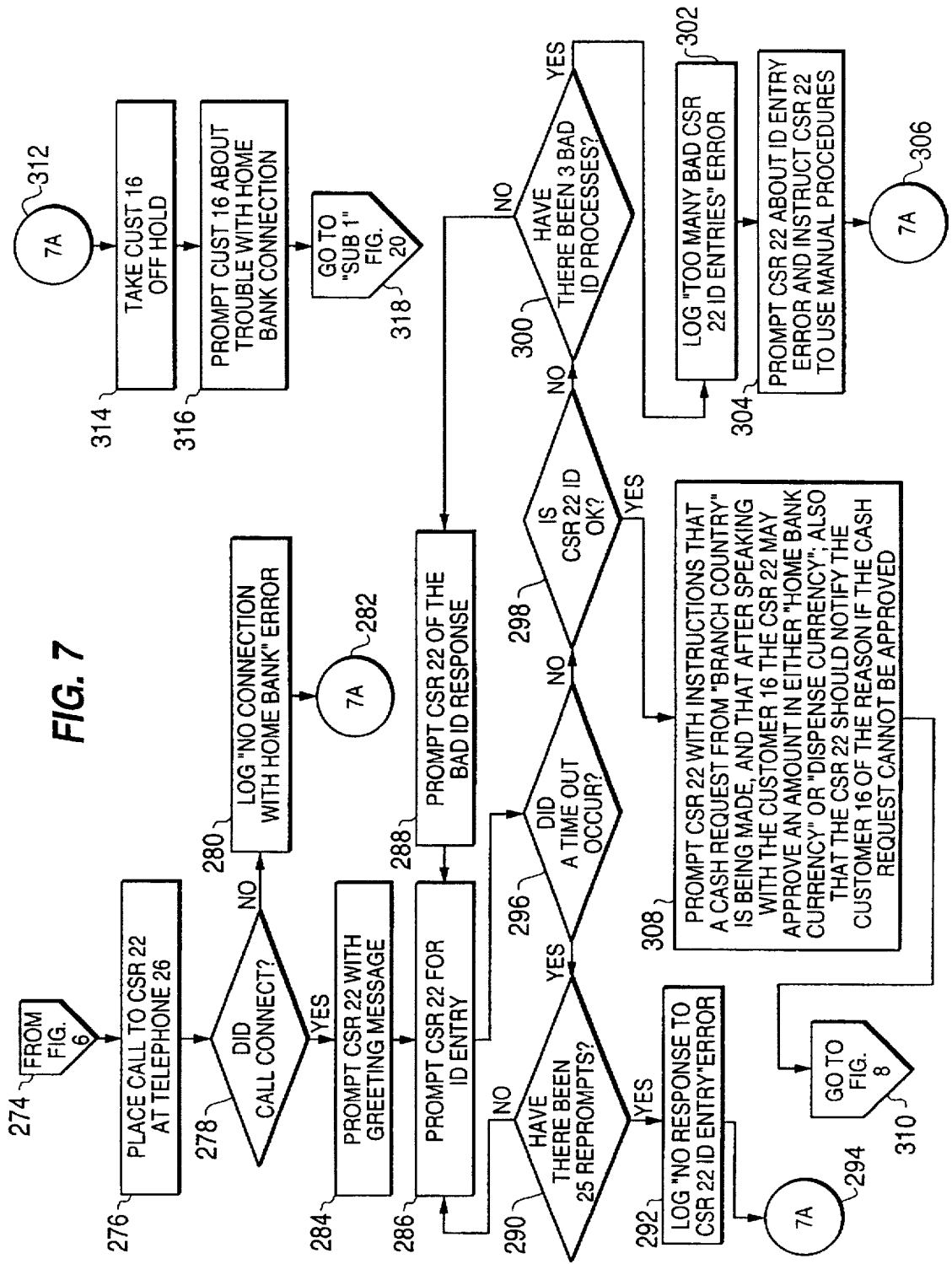
FIG. 7 diagrams the process of calling the home bank Customer Service Representative (CSR) and the CSR's identification to the system.

A phone call is now placed to the home bank CSR 22 (FIG. 7 block 276). If the call does not connect (NO branch from block 278), a no connection with home bank error is recorded (block 280). The customer 16 is taken off hold (block 314) and prompted of the trouble with the home bank connection (block 316). The process will now branch to the common subroutine to notify the LBR 12 of connection trouble (FIG. 20 block 666) as previously documented.

When a successful telephone connection with the CSR 22 is made (YES branch from block 278), the CSR 22 is prompted with a greeting message (block 284). Next, the CSR 22 is prompted for entry of their identification code (block 286). If a time out occurred (YES branch from block 296), a test for twenty five reprompts is performed (block 290). If there have not been twenty five reprompts (NO branch from block 290), the prompt for identification code entry is repeated (block 286). After twenty five reprompts (YES branch from block 290), a no response to CSR 22 identification entry error is recorded (block 292). A branch to block 314 will finish processing the error as previously documented. If no time out occurred (NO branch from block 296), the CSR 22 identification code is validated (block 298). If the identification code is invalid (NO branch from block 298), a test for three bad identification processes is performed (block 300). If the count of bad identification processes has not exceeded three (NO branch from block 300), the CSR 22 is prompted of the identification error (block 288) and the identification entry request is repeated (block 286). If three bad identification process have occurred (YES branch from block 300), an error of too many bad CSR 22 identification entries will be recorded (block 302). The CSR 22 will then be prompted of the identification entry error and instructed to use manual procedures for providing emergency cash (block 304). A branch to block 314 will finish processing the error as previously documented.

If the CSR 22 identification code is valid (YES branch from block 298), the CSR 22 is prompted with information about the emergency cash request (block 308). This information will include the identification of the local branch making the request and instructions that they will be speaking with the customer, may approve a cash amount in either their home bank currency or the local branch dispense currency and that they should notify the customer 16 of the reason if the cash request cannot be approved.

Figure 8:
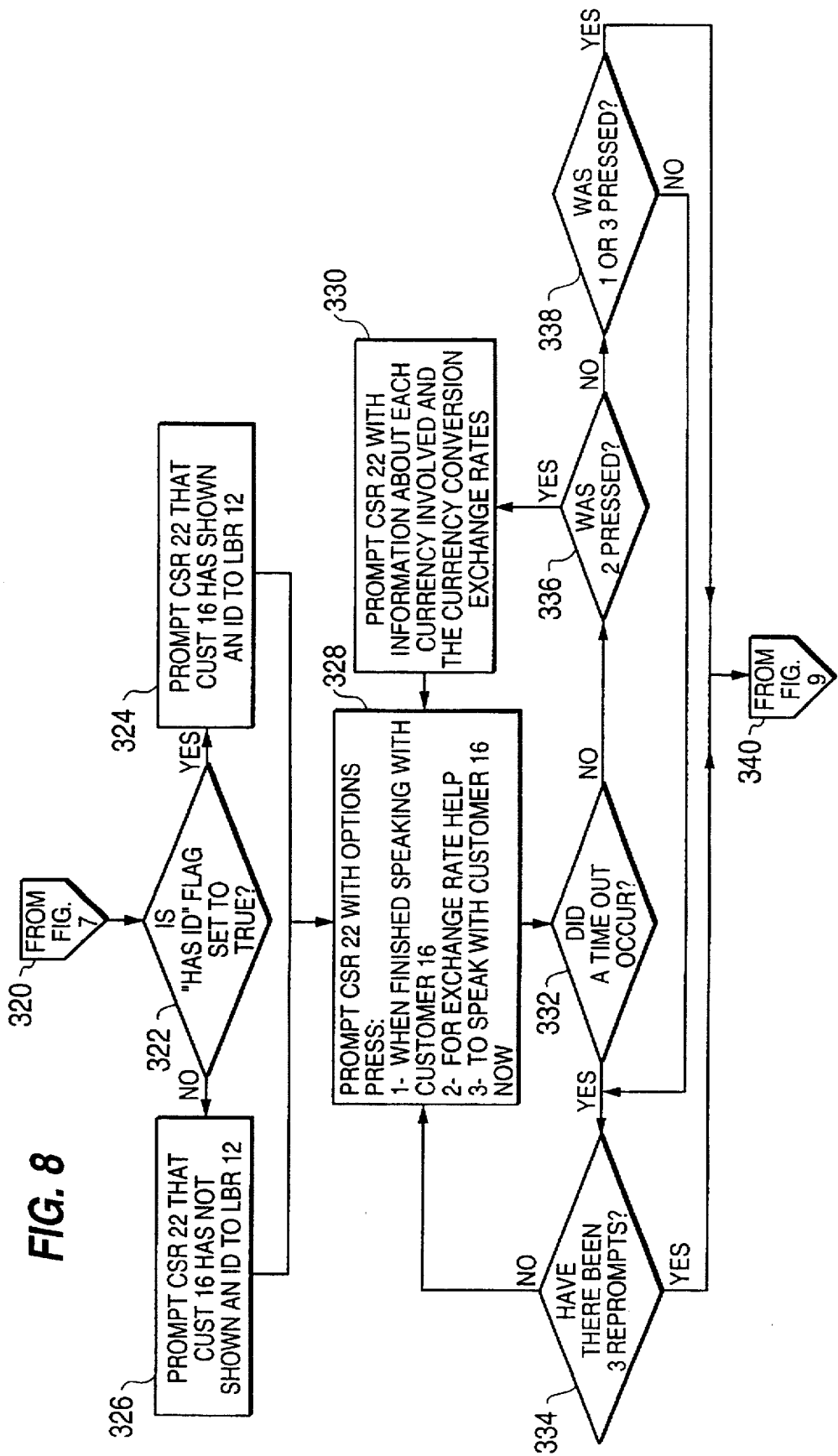
FIG. 8 diagrams the CSR's options for beginning an emergency cash authorization.

If the system flag storing the has shown identification status of the customers identification is set to true (YES branch from FIG. 8 block 322), the CSR 22 is prompted with notification that customer 16 identification has been shown to the LBR 12 (block 324). Otherwise (NO branch from block 322), the CSR 22 is notified that no identification has been shown (block 326).

The CSR 22 is now prompted with the following instructions and options: press one when finished speaking with the customer, press two for exchange rate help information or press three to begin speaking with the customer 16 now (block 328). If a time out occurred (YES branch from block 332), a test for three reprompts is performed (block 334). If there have not been three reprompts (NO branch from block 334), the instructions and options prompt is repeated (block 328). If no time out occurred and a key press of one, two or three was not detected (NO branch from block 332, 336 and 338), the process will branch to block 334 and test for a reprompt as previously documented. If two was pressed (YES branch from block 336), the CSR 22 is prompted with information about each currency involved in the transaction and all of the currency conversion exchange rates (block 330). If three reprompts were detected (YES branch from block 334) or a key press of one or three is detected (YES branch from block 338), the CSR 22 and the customer 16 will be linked together for voice telephone communication.

Figure 9:
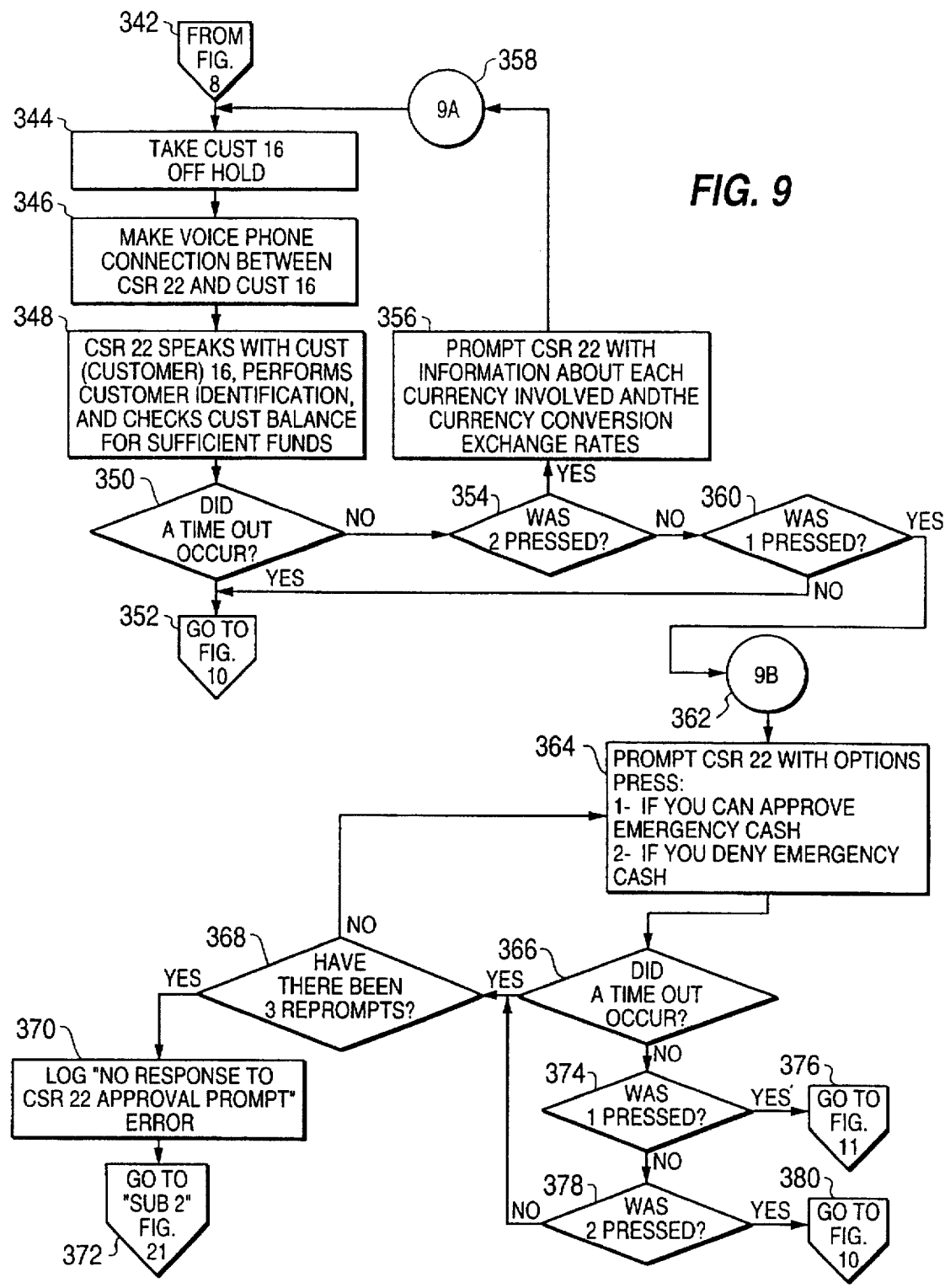
FIG. 9 diagrams the process of the CSR and customer telephonically speaking, the CSR verifying the customer's identification and bank account, and the CSR's initial approval or denial for emergency cash.
Figure 10:
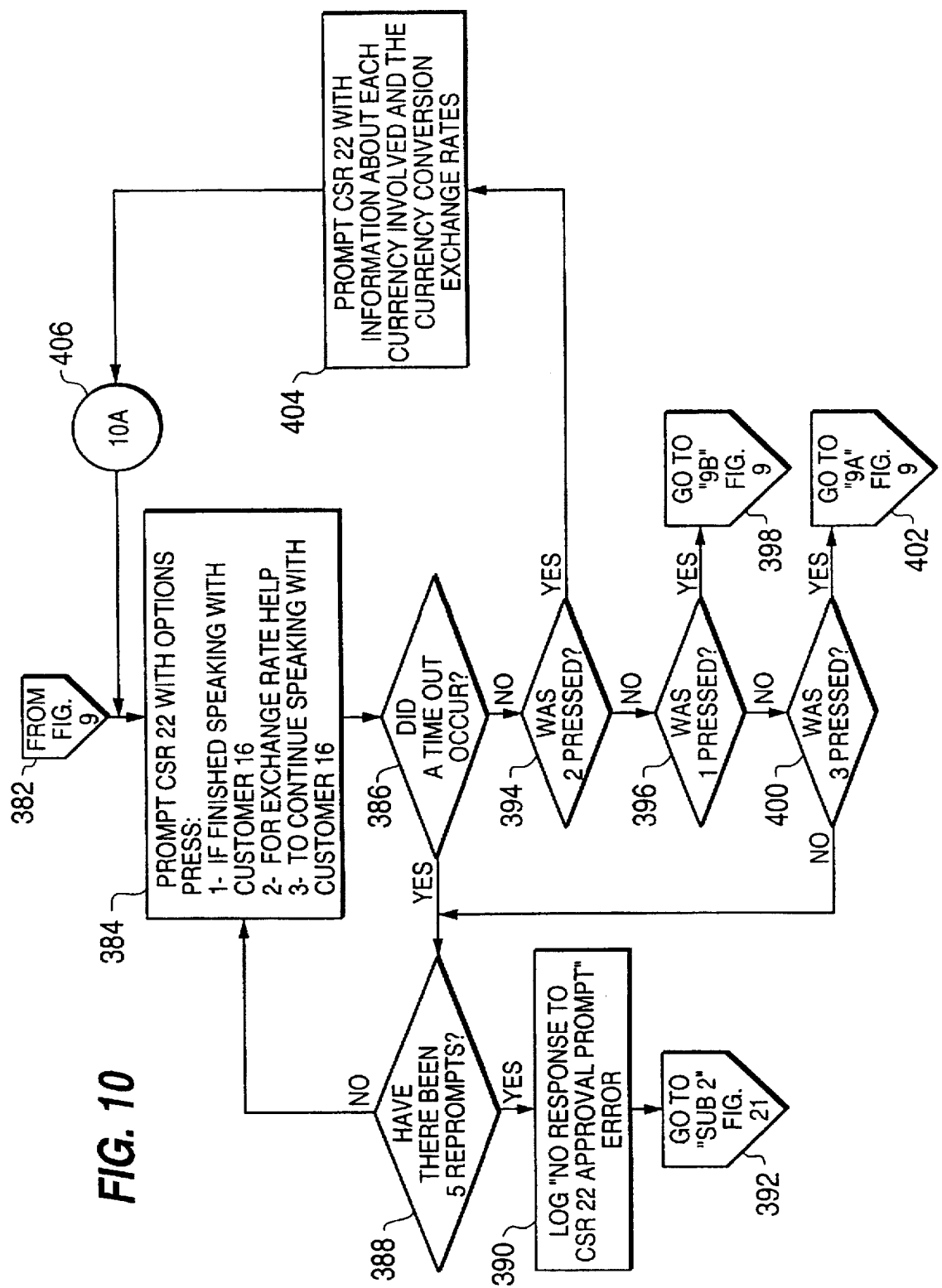
FIG. 10 is a continuation of the process in FIG. 9.

The customer 16 is now taken off hold (FIG. 9 block 344). A voice phone connection between the CSR 22 and the customer 16 is made (block 346). The CSR 22 will perform customer 16 identification by asking the customer 16 personal questions and then verify that the customer's account balance contains sufficient funds (block 348). If a time out occurred (YES branch from block 350) or no valid key press is detected (NO branch from block 354 and 360), the CSR 22 will be prompted with the following options: press one if finished speaking with the customer, press two for exchange rate help information or press three to continue speaking with the customer 16(FIG. 10 block 384). If a time out occurs during the prompt from block 384 (YES branch from block 386) or no valid key press was detected (NO branch from block 394, 396 and 400), a test for five reprompts is performed (block 388). If five reprompts have not been encountered (NO branch from block 388), the option prompt from block 384 will be repeated. If there have been five reprompts of block 384 (YES branch from block 388), a no response to CSR 22 approval prompt error will be recorded (block 390).

Figure 21:
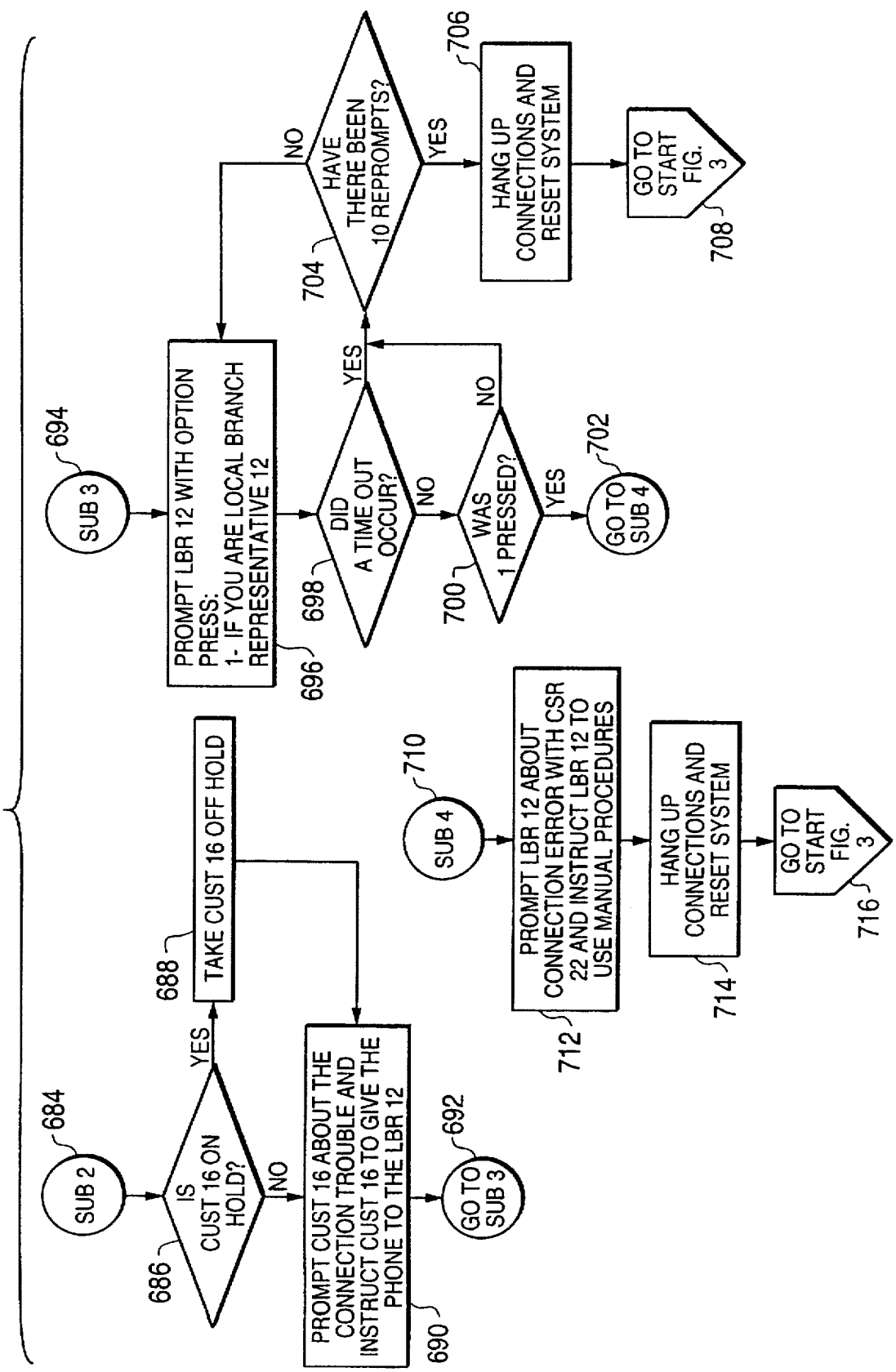
FIG. 21 is the flow chart of the process to detect time outs and last connections.

After the error from block 390, the process will branch to a set of common subroutines on FIG. 21. These routines will notify the customer 16 and the LBR 12 of connection trouble with the CSR 22. A branch to FIG. 21 block 686 determines if the customer 16 is still waiting on hold. If the customer 16 is on hold (YES branch from block 686), then the customer 16 will be taken off hold (block 688), prompted with the message about connection trouble and instructed to transfer the telephone to the LBR 12 (block 690). If the customer 16 was not on hold (No branch from block 686), then the connection trouble and telephone transfer messages are prompted to the customer 16(block 690).

A prompt is now given which asks the LBR 12 to press one when they are on the telephone (block 696). If a time out occurred (YES branch from block 698) or a valid key press of one was not entered (NO branch from block 700), a test for ten reprompts is performed (block 704). If there have not been ten reprompts (NO branch from block 704), the press one prompt is repeated (block 696). After ten reprompts (YES branch from block 704), the system processor 20 will hang up all connections and reset (block 706), then loop back to block 102 and restart its process (block 708). After a key press of one (YES branch from block 700), the LBR 12 is notified of the connection error and instructed to use manual procedures for providing emergency cash (block 712). The system processor 20 will now hang up all connections and reset (block 714), then loop back to block 102 and restart its process (block 716).

If a key press of two is detected in response to the prompt from block 384 (YES branch from block 394), the CSR 22 is prompted with information about each currency involved in the transaction and all of the currency conversion exchange rates (block 404) and a reprompt of the options in block 384 occurs. If three was pressed (YES branch from block 400), the process will branch to FIG. 9 block 344 and restart the connection between the CSR 22 and the customer 16 as previously documented (block 402).

If two was pressed during the voice connection process from FIG. 9 block 348 (YES branch from block 354), the CSR 22 is prompted with information about each currency involved in the transaction and all of the currency conversion exchange rates (block 356) and then the CSR 22 to customer 16 voice connection is restarted by branching to block 344.

If one was pressed during the voice connection process from FIG. 9 block 348 (YES branch from block 360) or one was pressed in response to the options prompt from FIG. 10 block 384 (YES branch from block 396), the process will branch to the options prompt from FIG. 9 block 364.

From FIG. 9 block 364, the CSR 22 is prompted with the following options: press one if you can approve an emergency cash transaction or press two if you are denying an emergency cash transaction. If a time out occurs during the prompt from block 364 (YES branch from block 366) or no valid key press was detected (NO branch from block 374 and 378), a test for three reprompts is performed (block 368). If three reprompts have not been encountered (NO branch from block 368), the option prompt from block 364 will be repeated. If there have been three reprompts of block 364 (YES branch from block 368), a no response to CSR 22 approval prompt error will be recorded (block 370) and the system will branch to the common subroutines documented above that notify the customer 16 and LBR 12 of a connection error then restart the system (FIG. 21 block 686).

If two was pressed in response to the options from block 364 (YES branch from block 378), a branch to the CSR 22 denies routine (FIG. 12 block 440) will occur. The CSR 22 is prompted with the following message and options: "You do not wish to approve an emergency cash transaction."; press one to end this call or press two to speak with the customer 16 again (block 440). If a time out occurs during the prompt from block 440 (YES branch from block 442) or no valid key press was detected (NO branch from blocks 450 and 452), a test for three reprompts is performed (block 444). If three reprompts have not been encountered (NO branch from block 444), the option prompt from block 440 will be repeated. If there have been three reprompts of block 440 (YES branch from block 444), a no response to CSR 22 denies prompt error will be recorded (block 446) and the system will branch to the common subroutines documented above that notify the customer 16 and LBR 12 of a connection error then restart the system (FIG. 21 block 686). If two was pressed branch from block 452), the process branches to the beginning of the CSR 22 and customer 16 voice connection option (FIG. 9 block 344). If one was pressed (YES branch from block 450), the CSR 22 is prompted with the message "Sorry you cannot approve the cash request. Thanks for helping. You may hang up now." (block 456), the customer 16 is then prompted with the message "Sorry, the transaction cannot be approved, good bye." (block 458) and a transaction denied error is recorded (block 460).

Figure 22:
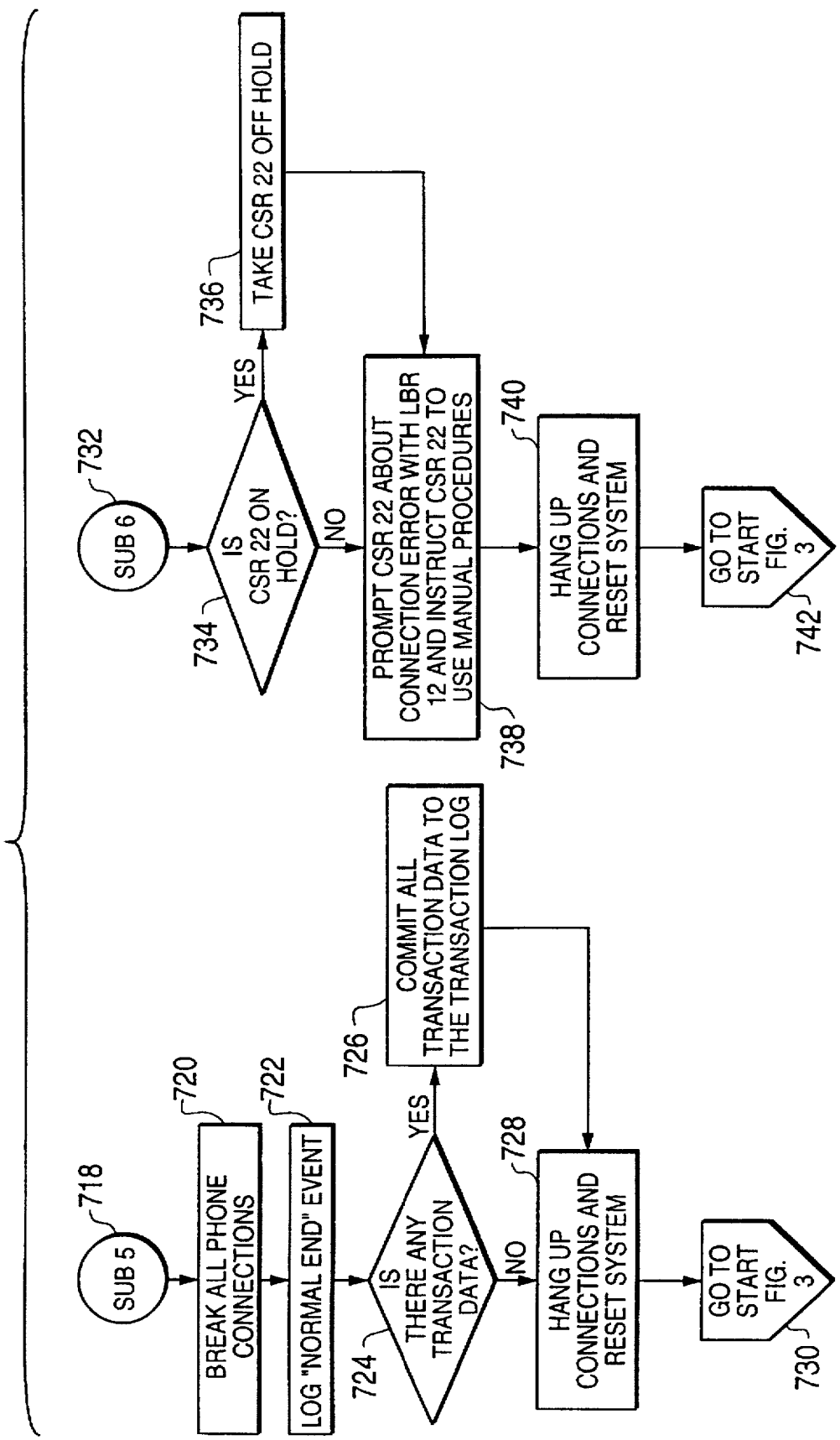
FIG. 22 is the flow chart of the process to determine the end of the financial transaction.

The system will now come to a normal end. Normal end processing is flow charted by the common subroutine starting from FIG. 22 block 720. All phone connections are disconnected (FIG. 22 block 720). A normal end event is recorded (block 722). If there is any transactional data (Yes branch from block 724), that data is committed to the transaction log file (block 726). The storage format of the transaction log file is diagrammed by FIG. 27; this file records all detail data about an approved emergency cash transaction. The system processor 20 will now hang up all connections and reset (block 728), then loop back to block 102 and restart its process (block 730).

Figure 11:
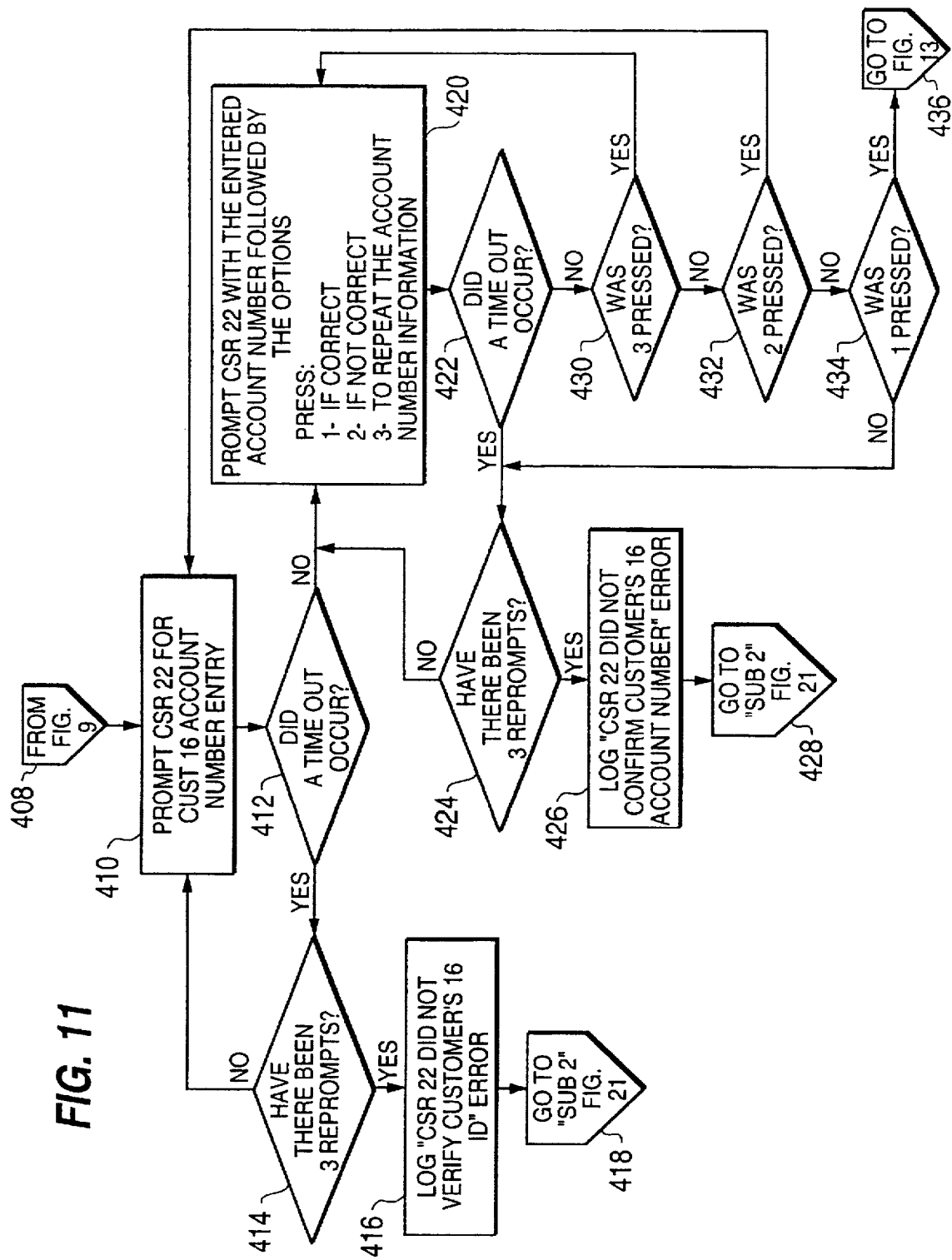
FIG. 11 diagrams the customer ID verification.
Figure 13:
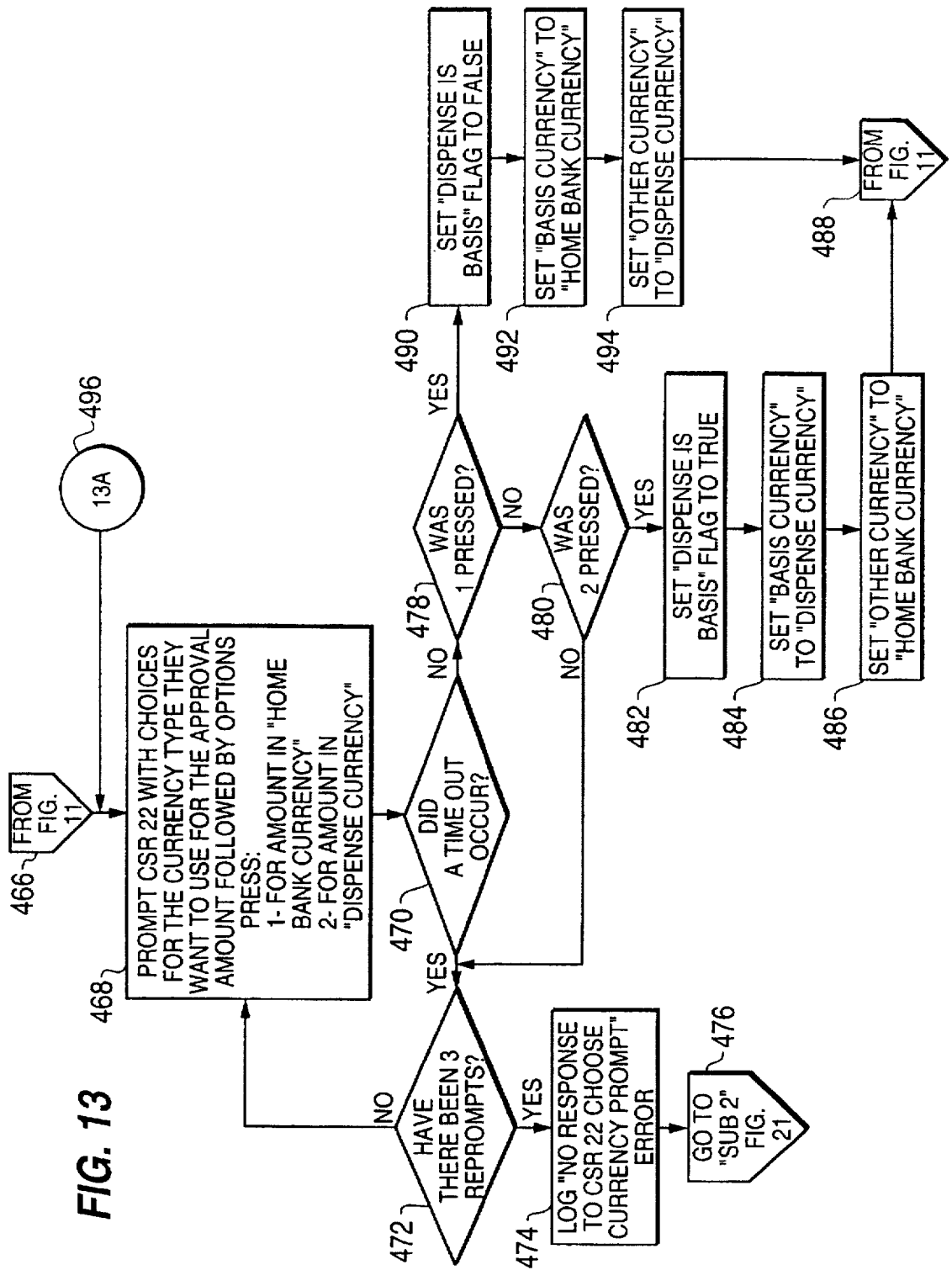
FIG. 13 diagrams the CSR's choice of currency to use as the basis for approval amounts.

If one was pressed in response to the options from block 364 (YES branch from block 374), a branch to the CSR 22 approves routine (FIG. 11 block 410) will occur. The CSR 22 is prompted for entry of the customer's account number (block 410). If a time out occurs during the prompt from block 410 (YES branch from block 412), a test for three reprompts is performed (block 414). If three reprompts have not been encountered (NO branch from block 414), the account entry prompt from block 410 will be repeated. If there have been three reprompts of block 410 (YES branch from block 414), a CSR 22 did not verify customer's identification error will be recorded (block 416) and the system will branch to the common subroutines documented above that notify the customer 16 and LBR 12 of a connection error then restart the system (FIG. 21 block 686). If no time out has occurred (No branch from block 412), the CSR 22 will have the entered the account number repeated to them, followed by the options: press one if correct, press two if not correct or press three to repeat the account number information (block 420). If a time out occurs (YES branch from block 422) or no valid key press was detected (NO branch from blocks 430, 432 and 434), a test for three reprompts is performed (block 424). If three reprompts have not been encountered (NO branch from block 424), the option prompt from block 420 will be repeated. If there have been three reprompts of block 420 (YES branch from block 424), a CSR 22 did not confirm the customer's account number error will be recorded (block 426) and the system will branch to the common subroutines documented above that notify the customer 16 and LBR 12 of a connection error then restart the system (FIG. 21 block 686). If two was pressed (YES branch from block 432), the prompt for account number entry is repeated (block 410). If three was pressed (YES branch from block 430), the account number and validation options prompt is repeated (block 420). If one is pressed (YES branch from block 434), the processing will branch to the CSR 22 currency choice options (FIG. 13 block 468).

The CSR 22 is prompted with the choices for the currency type that they want to use for the approval amount. The options prompted are press one for amount in home bank currency or press two for amount in dispense currency (FIG. 13 block 468). If a time out occurs during the prompt from block 468 (YES branch from block 470) or no valid key press was detected (NO branch from block 478 and 480), a test for three reprompts is performed (block 472). If three reprompts have not been encountered (NO branch from block 472), the currency choice prompt from block 468 will be repeated. If there have been three reprompts of block 468 (YES branch from block 472), a no response to the CSR 22 choose currency prompt error will be recorded (block 474)

and the system will branch to the common subroutines documented above that notify the customer 16 and LBR 12 of a connection error then restart the system (FIG. 21 block 686). If one was pressed (YES branch from block 478), three system flags will be set as follows: a flag indicating the dispense currency is the basis for calculations is set to false (block 490), a flag is set identifying the basis currency is the home bank currency (block 492) and a flag is set identifying the other currency is the dispense currency (block 494). If two was pressed (YES branch from block 480), three system flags will be set as follows: a flag indicating the dispense currency is the basis for calculations is set to true (block 482), a flag is set identifying the basis currency is the dispense currency (block 484) and a flag is set identifying the other currency is the home bank currency (block 486). The system will now branch to the emergency cash amount entry process (FIG. 14 block 500).

Figure 14:
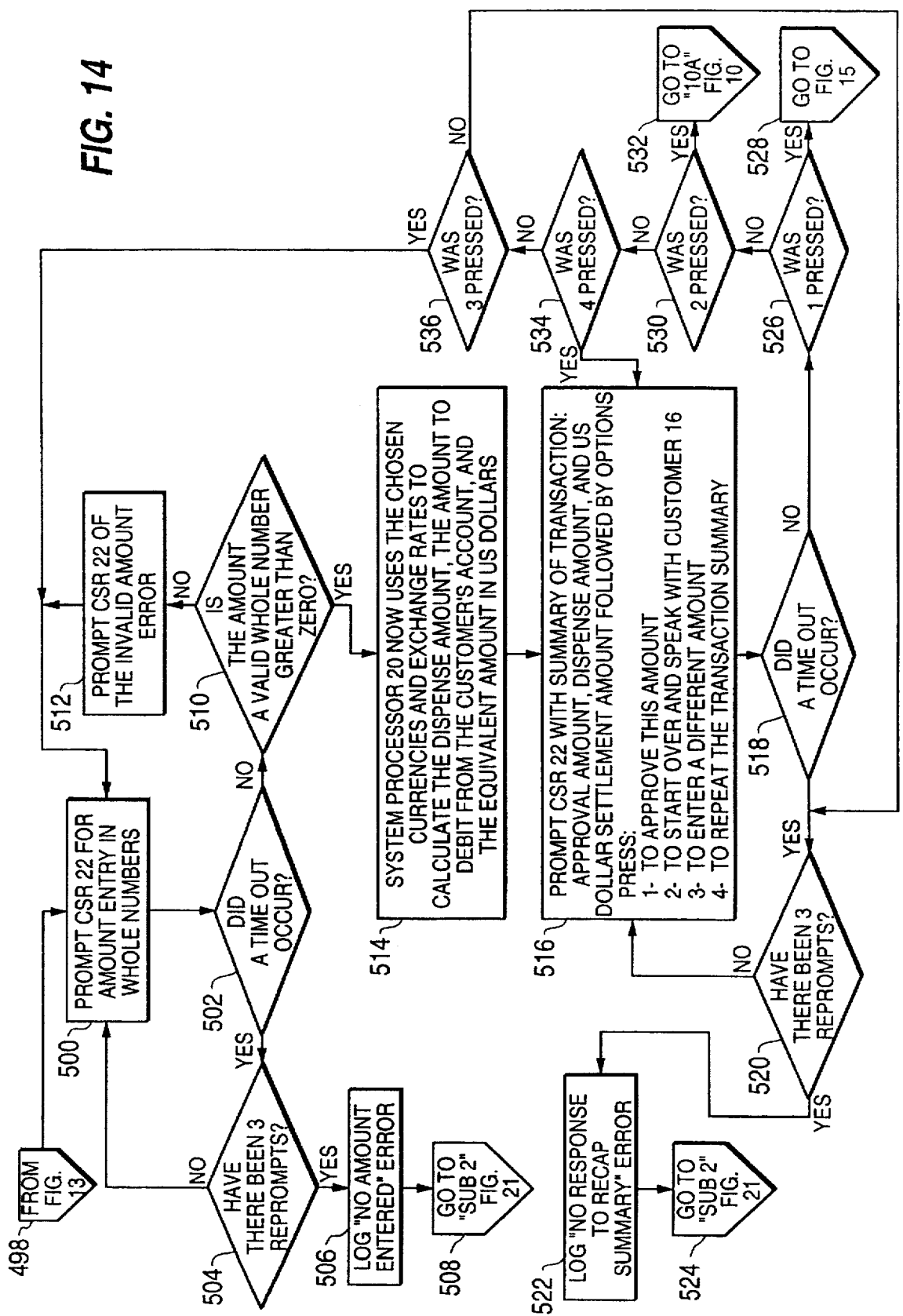
FIG. 14 diagrams the entry of the cash approval amount, the exchange rate calculations, the transaction summary, and options for verifying or restarting the transaction process.

The CSR 22 is prompted for a cash amount in whole numbers (FIG. 14 block 500). If a time out occurs during the entry (YES branch from block 502), a test for three reprompts is performed (block 504). If three reprompts have not been encountered (NO branch from block 504), the cash amount entry prompt from block 500 will be repeated. If there have been three reprompts of block 500 (YES branch from block 504), a no amount entered error will be recorded (block 506) and the system will branch to the common subroutines documented above that notify the customer 16 and LBR 12 of a connection error then restart the system (FIG. 21 block 686). If no time out has occurred (No branch from block 502), the amount is validated to be a whole number greater than zero (block 510). If the amount is invalid (NO branch from block 510), the CSR 22 is prompted of the invalid amount error (block 512) and the process branches back to the entry prompt (block 500). If the amount is valid (YES branch from block 510), the system processor 20 will use the chosen currencies, basis selection, and exchange rates to calculate the transaction conversion from approval amount to dispense amount, the amount to debit from the customer's account, and the equivalent amount in U.S. dollars (block 514).

The CSR 22 is now prompted with a transaction summary which includes the approval amount, the dispense amount and the US dollar settlement amount, followed by these options: press one to approve this amount, press two to start over and speak with the customer, press three to enter a different amount or press four to repeat the transaction summary (block 516). If a time out occurs during the prompt from block 516 (YES branch from block 518) or no valid key press was detected (No branch from blocks 526, 530, 534 and 536), a test for three reprompts is performed (block 520). If three reprompts have not been encountered (NO branch from block 520), the option prompt from block 516 will be repeated. If there have been three reprompts of block 516 (YES branch from block 520), a no response to the recap summary error will be recorded (block 522) and the system will branch to the common subroutines documented above that notify the customer 16 and LBR 12 of a connection error then restart the system (FIG. 21 block 686). If four was pressed (YES branch from block 534), the transaction summary is repeated (block 516). If three was pressed (YES branch from block 536), the amount entry prompt is repeated (block 500). If two was pressed (YES branch from block 530), the processing will branch to FIG. 10 block 384, as previously documented, and reprompt the options to speak with the customer. If one was pressed (YES branch from block 526), the system will branch to the customer 16 notification process (FIG. 15 block 540).

Figure 15:
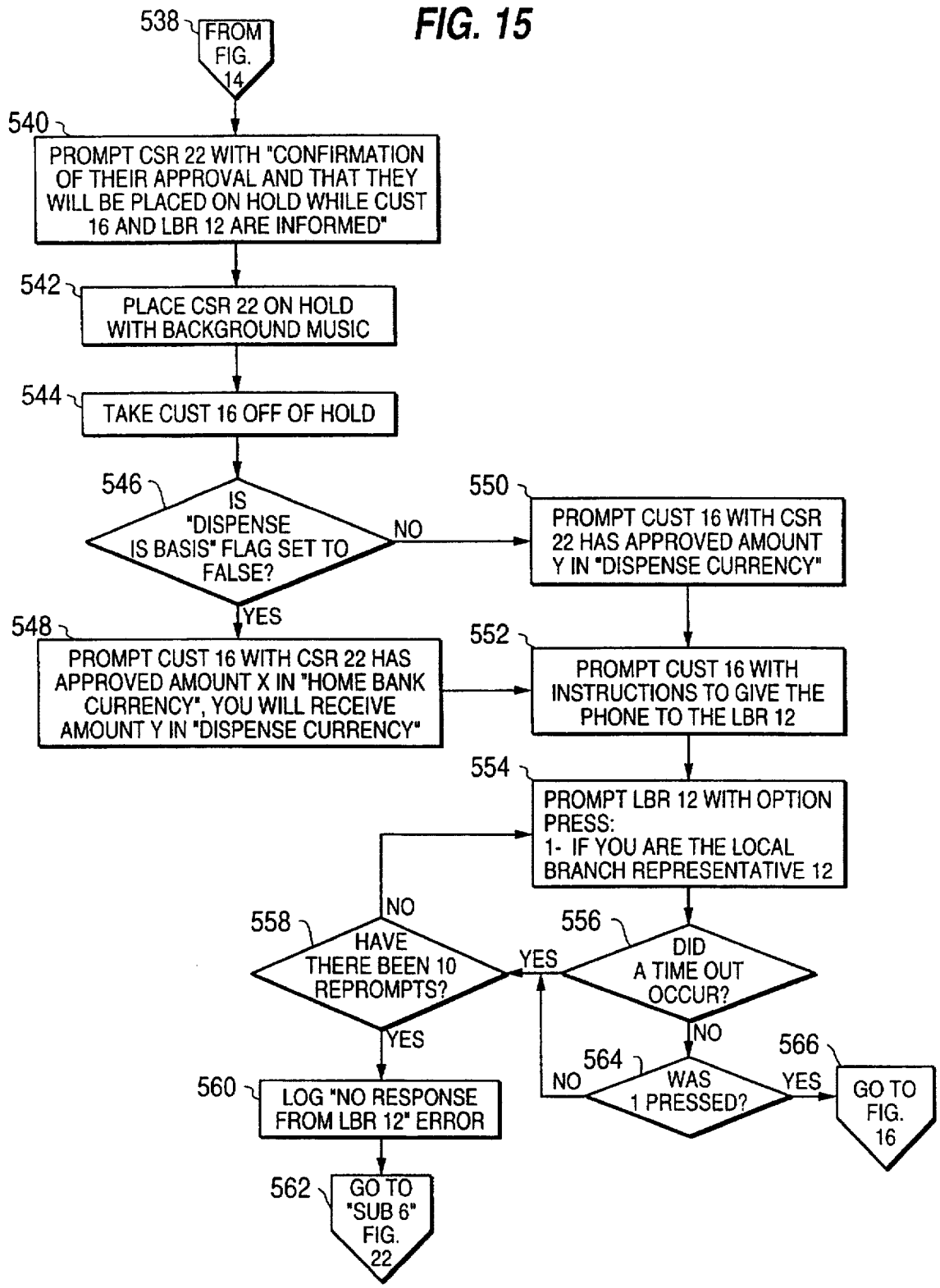
FIG. 15 diagrams the customer's notification of the CSR's transaction decisions.

The CSR 22 is prompted with a confirmation message about their approval and told that they will be placed on hold while the customer 16 and the LBR 12 are informed of the transaction (FIG. 15 block 540). The CSR 22 is then placed on hold (block 542). The customer 16 is removed from hold (block 544). If the flag indicating the dispense currency is the basis currency is set to false (YES branch from block 546), the customer 16 is prompted with the message "The CSR 22 has approved the amount X in home bank currency and you will receive amount Y in dispense currency." (block 548). If the dispense currency flag is true (NO branch from block 546), the customer 16 is prompted with the message "The CSR 22 has approved the amount Y in dispense currency." (block 550). The customer 16 is now prompted to give the telephone to the LBR 12 (block 552). A prompt is now given which asks the LBR 12 to press one when they are on the telephone (block 554). If a time out occurred (YES branch from block 556) or a valid key press of one was not entered (NO branch from block 564), a test for ten reprompts is performed (block 558). If there have not been ten reprompts (NO branch from block 558), the press one prompt is repeated (block 554). After ten reprompts (YES branch from block 558), a no response from LBR 12 error is recorded (block 560). The system will now branch to the common subroutine that notifies the CSR 22 that a connection problem has occurred (FIG. 22 block 734). If the CSR 22 is on hold (YES branch from block 734), take the CSR 22 off hold (block 736). The CSR 22 is now prompted about the connection error with the LBR 12 and instructed to use manual procedures for providing emergency cash (block 738). The system processor 20 will now hang up all connections and reset (block 740), then loop back to block 102 and restart its process (block 742). After a key press of one is detected (YES branch from block 564), the system will branch to the LBR 12's summary and verification process (FIG. 16 block 570).

Figure 16:
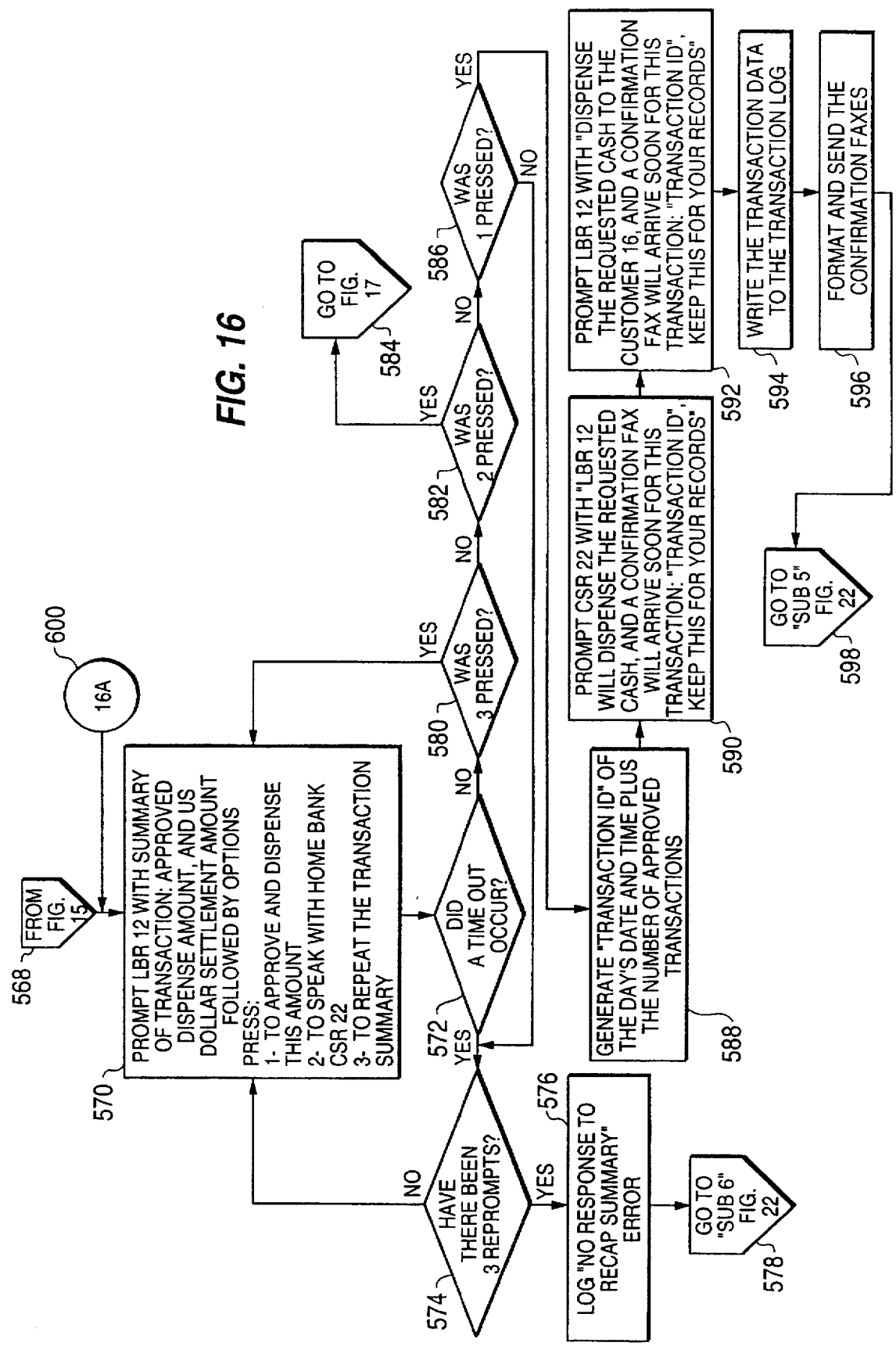
FIG. 16 diagrams the LBR's summary and verification of the transaction and transaction identification and facsimile notification.

The LBR 12 is prompted with a transaction summary which includes the approved dispense amount and the US dollar settlement amount, followed by the options: press one to approve and dispense this amount, press two to speak with the home bank CSR 22 or press three to repeat the transaction summary (FIG. 16 block 570). If a time out occurs during the prompt from block 570 (YES branch from block 572) or no valid key press was detected (NO branch from blocks 580, 582 and 586), a test for three reprompts is performed (block 574). If three reprompts have not been encountered (NO branch from block 574), the transaction summary prompt from block 570 will be repeated. If there have been three reprompts of block 570 (YES branch from block 574), a no response to the recap summary error will be recorded (block 576) and then a branch to the previously documented subroutine to notify the CSR 22 of connection trouble (FIG. 22 block 732). If three was pressed (YES branch from block 580), the transaction summary is repeated (block 570).

If one was pressed in response to block 570 (YES branch from block 586), the completion of the transaction is performed. First a transaction identification is generated consisting of the current day's date and time plus the number of currently approved transactions (block 588). Next, the CSR 22 is prompted with the following message: "The LBR 12 will dispense the requested cash; a confirmation facsimile will arrive soon for this transaction 'transaction identification'. Keep this facsimile for your records." (block 590). Now, the LBR 12 is prompted with the following message: "Dispense the requested cash to the customer; a confirmation facsimile will arrive soon for this transaction 'transaction identification'. Keep this facsimile for your records." (block 592). All transaction data is written to the transaction log (block 594). The confirmation facsimiles are formatted and sent to the LBR 12 and the CSR 22 (block 596). Sample facsimile formats, illustrating the titled sample data and data field locations, are diagrammed on FIG. 29 and 30. A third version of the facsimile is kept on file in the financial transaction application and is used as backup documentation for the transaction; this format is diagrammed on FIG. 31. A facsimile log file 42 (FIG. 32) is maintained to track all facsimile activity for approved transactions. In addition to the facsimiles, a weekly summary report 44 that combines the data from the Transaction Log 36 (FIG. 27) and the Businesses Database 32 (FIG. 26) is formatted and sent to each involved location; this format is illustrated on FIG. 28. Once the facsimiles are formatted and sent the system will branch to the previously documented subroutine to terminate a normal end to the transactions (FIG. 22 block 718).

Figure 17:
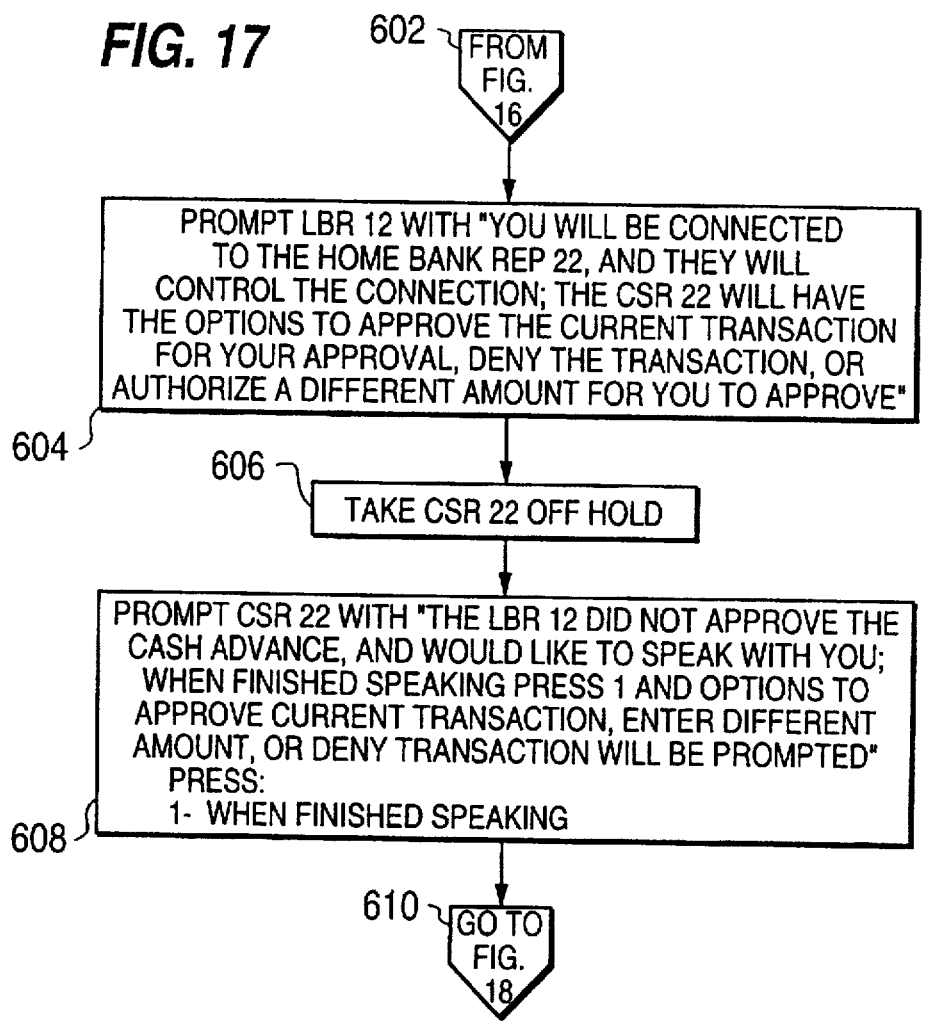
FIG. 17 diagrams the connection between the LBR and the CSR for the purpose of discussing the transaction.
Figure 18:
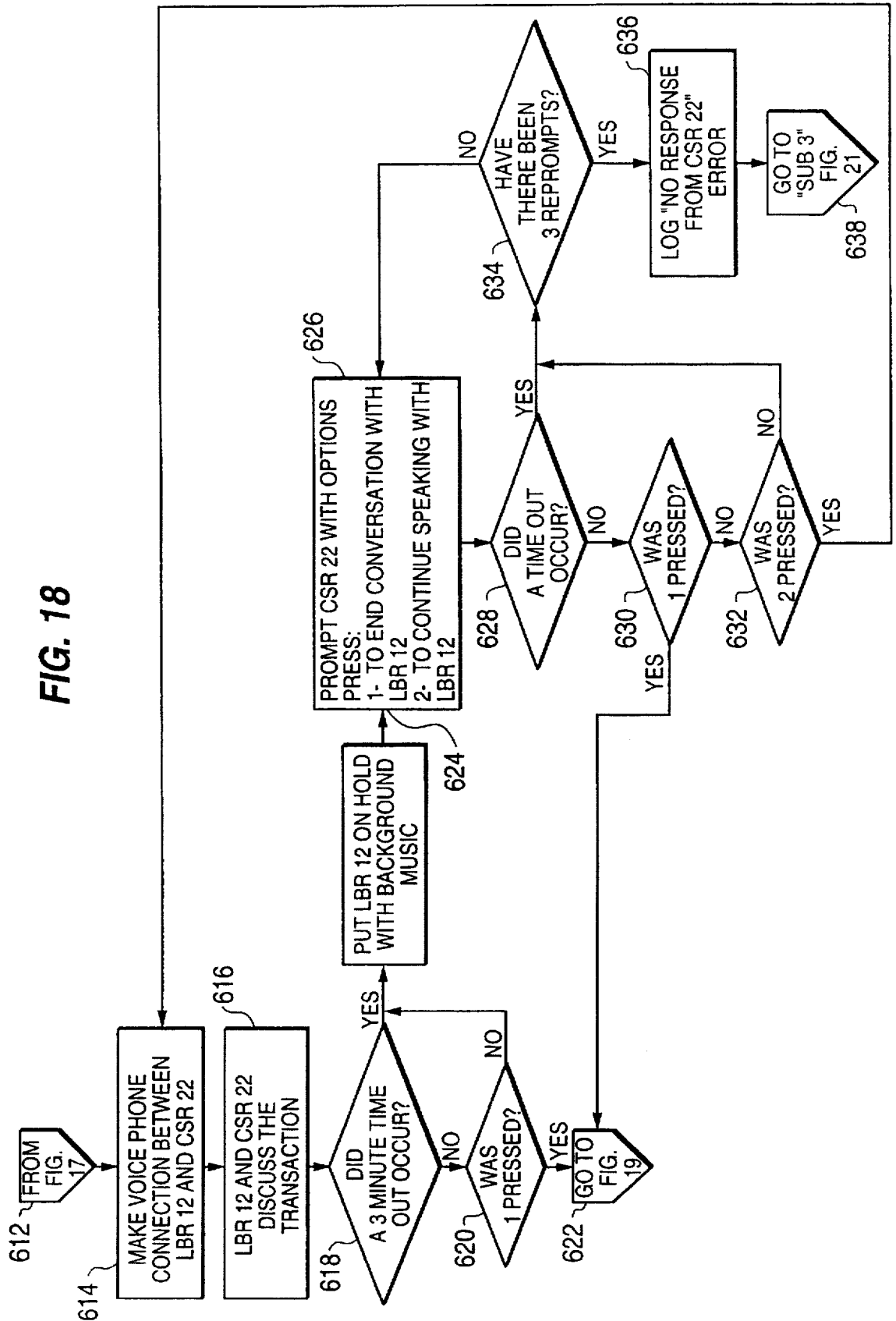
FIG. 18 is a continuation of FIG. 15 and the transaction discussion process.
Figure 19:
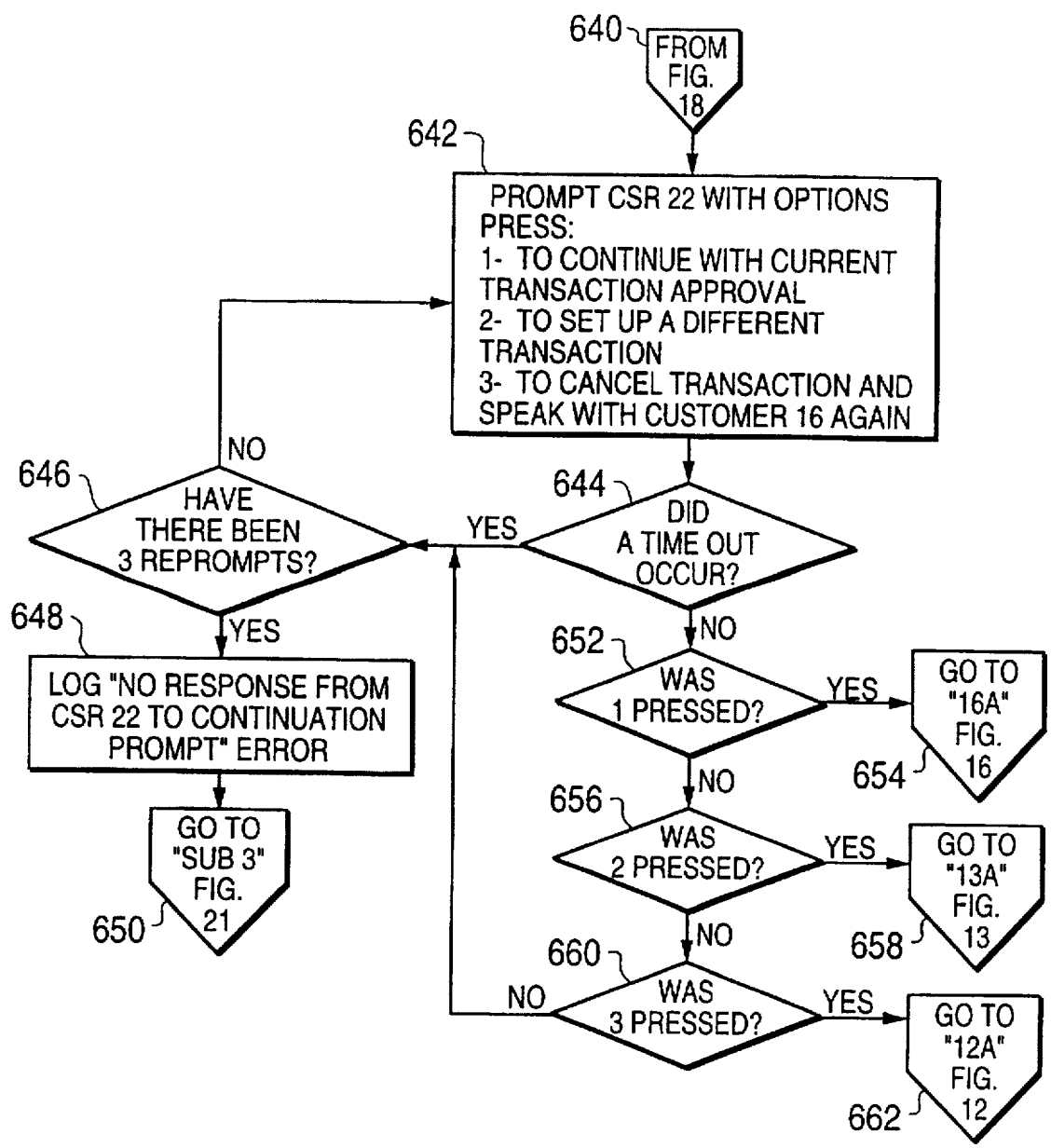
FIG. 19 diagrams the CSR's options for further processing of the emergency cash transaction after speaking with the LBR.

If two is pressed in response to block 570 (YES branch from block 582), the system will branch to the LBR 12 and CSR 22 voice connection process (FIG. 17 block 602). The LBR 12 is prompted with the message: "You will be connected to the home bank CSR 22, and they will control the connection. The CSR 22 will have the options to approve the current transaction for your approval, to deny the transaction or to authorize a different amount for you to approve." (block 604). The CSR 22 is taken off hold (block 606). The CSR 22 is prompted with the message: "The LBR 12 did not approve the cash advance, and would like to speak with you. When you have finished speaking with the LBR 12 press one and the options to approve the current transaction, to enter a different amount or to deny the transaction will be prompted. Press one when finished speaking." (block 608). Now, a voice phone connection between the LBR 12 and the CSR 22 is made (FIG. 18 block 614). The CSR 22 and LBR 12 will discuss the transaction (block 616). If a three minute time out has occurred (YES branch from block 618) or if a key press other than one is detected (NO branch from block 620), the LBR 12 is placed on hold (block 624). The CSR 22 is prompted with the options: press one to end the conversation with the LBR 12 or press two to continue speaking with the LBR 12 (block 626). If a time out occurs during the prompt from block 626 (YES branch from block 628) or no valid key press was detected (No branch from blocks 630 and 632), a test for three reprompts is performed (block 634). If three reprompts have not been encountered (NO branch from block 634), the conversation continuation options prompt from block 626 will be repeated. If there have been three reprompts of block 626 (YES branch from block 634), a no response from the CSR 22 error will be recorded (block 636) and then the system will branch to the previously documented subroutine to notify the LBR 12 of connection trouble (FIG. 21 block 694). If two was pressed (YES branch from block 632), the voice connection process is restarted (block 614). If one was press in response to block 626 (YES branch from block 630) or during the LBR 12 and CSR 22 conversation (YES branch from block 620), the system will branch to the options prompt for the CSR 22 to choose the next step (FIG. 19 block 640).

Figure 12:
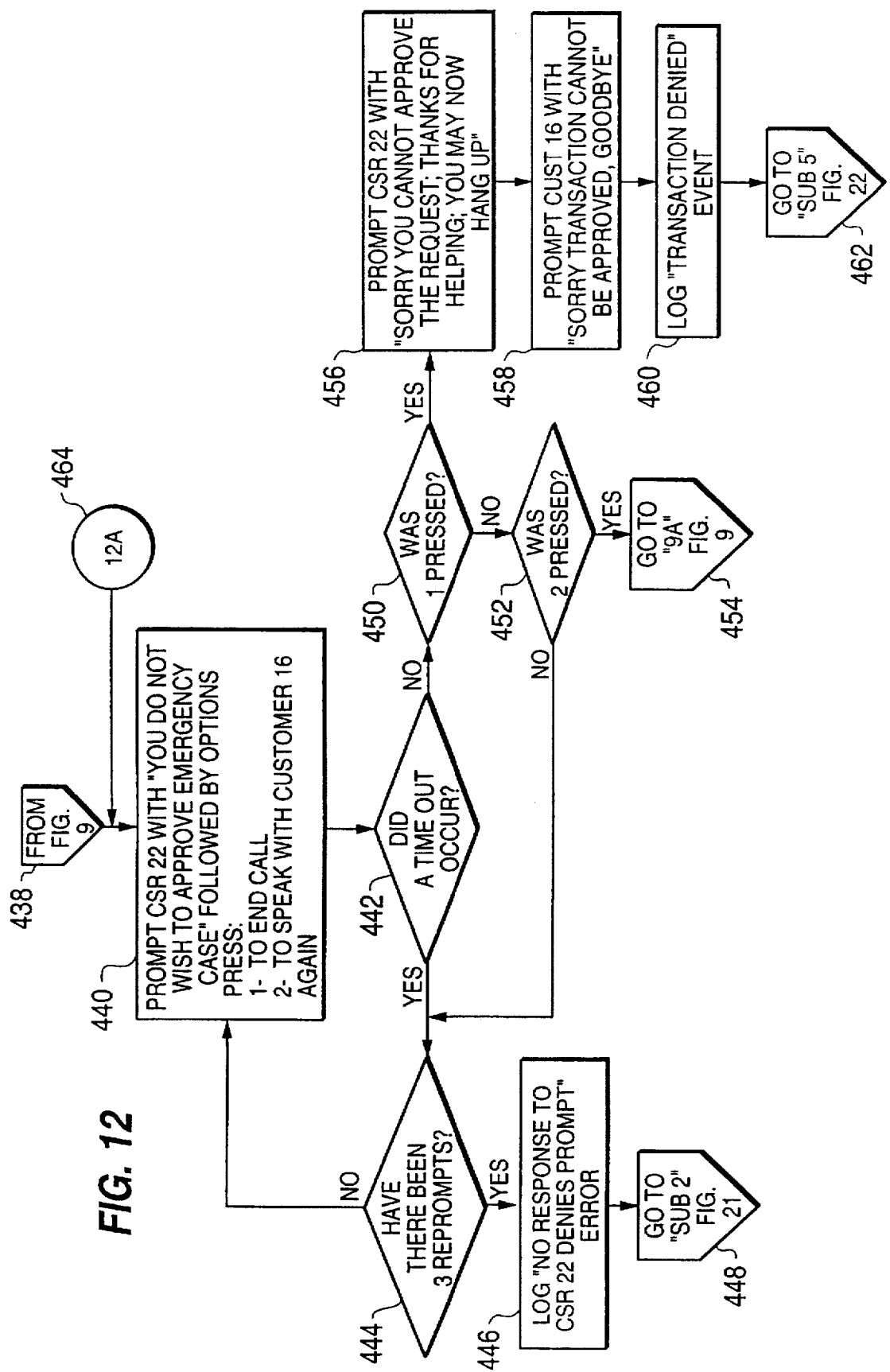
FIG. 12 diagrams the processing of a CSR denial.

The CSR 22 is prompted with the following options: press one to continue with the current transaction approval, press two to set up a different transaction or press three to cancel the transaction and speak with the customer 16 again (block 642). If a time out occurs during the prompt from block 642 (YES branch from block 644) or no valid key press was detected (NO branch from blocks 652, 656 and 660), a test for three reprompts is performed (block 646). If three reprompts have not been encountered (No branch from block 646), the CSR 22 approval options prompt from block 642 will be repeated. If there have been three reprompts of block 642 (YES branch from block 646), a no response from the CSR 22 error will be recorded (block 648) and then the system will branch to the previously documented subroutine to notify the LBR 12 of connection trouble (FIG. 21 block 694). If one was pressed (YES branch from block 652), the system will branch to the LBR 12's summary and transaction verification process (FIG. 16 block 570). If two is pressed (YES branch from block 656), the system will branch to the CSR 22's currency choice process (FIG. 13 block 468). If three was pressed (YES branch from block 660), the system will branch to the CSR 22 denial process (FIG. 12 block 440).

This is the conclusion of normal flow processing.

Figure 23:
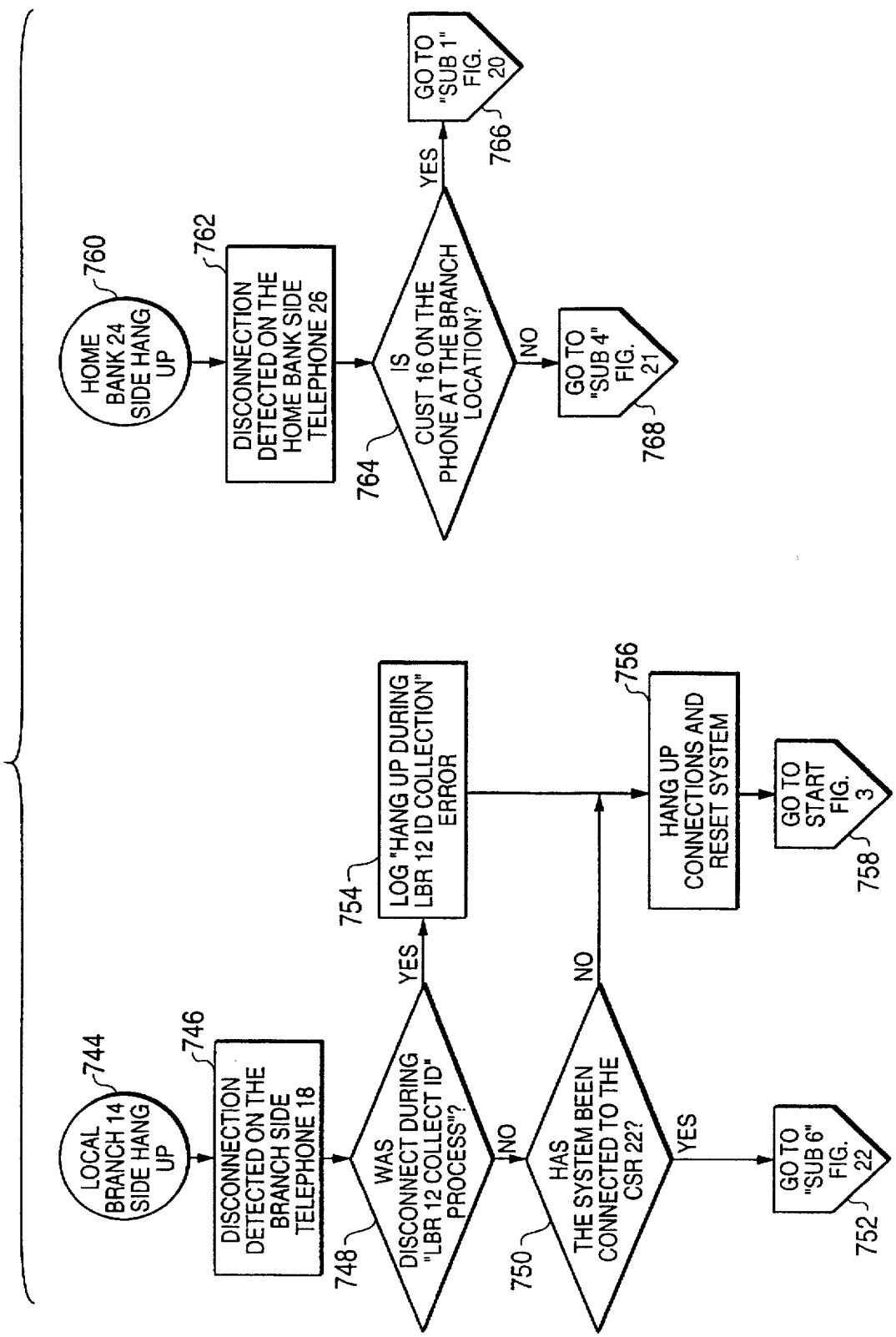
FIG. 23 is the flow chart of the HANG UP EVENT processes.

The system processor 20 will detect a hang up event at any time during the processing of any participant who is active in the system. When a hang up on the branch side of the communications link is detected the system 20 will branch to the hang up subroutine on FIG. 23 at block 744. A disconnection is detected (block 746). A test is performed to determine if the branch hang up was during the identification password entry process for the LBR 12 (block 748). If the hang up was during identification entry (YES branch from block 748), a hang up during LBR 12 identification collection error is recorded (block 754). If the hang up was not during identification collection (NO branch from block 748), a test is performed to determine if the system has been connected to the home bank CSR 22 (block 750). If the CSR 22 has been connected (YES branch from block 750), the system will branch to the common subroutine, as documented previously, to notify the CSR 22 of a connect problem (FIG. 22 block 732). If the system had not connected to the CSR 22 (NO branch from block 750) or the hang up was during LBR 12 identification collection (branch from block 754), the system processor 20 will hang up all connections and reset (block 756), then loop back to block 102 and restart its process (block 758). If a disconnection is detected on the home bank side of the communications link, the system will branch to the CSR 22 side hang up subroutine (FIG. 23 block 760). A disconnection is detected on the home bank side connection (block 762). A test is performed to determine if the customer 16 is on the telephone at the time of the CSR 22 disconnect (block 764). If the customer 16 was on the phone (YES branch from block 764), a branch to the customer 16 hang up notification subroutine as previously documented (FIG. 20 block 664). If the customer 16 was not on the phone (NO branch from block 764), the system will branch to the LBR 12 notification subroutine as previously documented (FIG. 21 block 710).

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

We claim:

1. A method for performing financial transactions involving a customer who resides in a home country in which a first language is spoken and is a customer of a financial institution and a first representative of said financial institution who works in a second country and who speaks a second language, the method comprising the steps of:

initiating said financial transaction by said first representative contacting a processing system and inputting first data corresponding to said first representative's identification;

validating said first representative's identification;

prompting said customer to identify said first language by said processing system prompting said customer in different languages including said first language;

identifying said first language as a result of said customer's response to said prompts;

using said first language to prompt said customer to identify said customer's home country by said processing system prompting with different countries which use said first language including said home country;

identifying said customer's home country as a result of said customer's response to said prompts;

identifying and contacting a second representative affiliated with said financial institution and which speaks said first language and which has access to said customer's financial records and accounts in said financial institution via a communication between said processing system and said second representative;

validating the identification of said second representative;

connecting said customer and said second representative via said processing system;

discussing said financial transaction between said customer and said second representative in said first language via said connection;

determining whether said financial transaction is acceptable to said financial institution by said second representative accessing financial records of said customer;

authorizing said financial transaction by said second representative as a result of said second representative accessing said financial records of said customer and communicating the authorization to said processing system;

informing said first representative of said authorization; and consummating said authorized financial transaction between said first representative and said customer.

2. The method of claim 1 wherein said financial transaction is an emergency cash payment.

3. The method of claim 1 further comprising the step of:
documenting said financial transaction by said processing system automatically generating at least one report.

4. The method of claim 3 wherein said processing system automatically generates a report sent to the location where said first representative works.

5. The method of claim 3 wherein said processing system automatically generates a report sent to the location where said customer keeps said customer's account.

6. The method of claim 3 wherein said processing system automatically generates a report stored in a central file of financial transactions performed with said processing system.

7. The method of claim 4 wherein said report is sent to said location where said first representative works via facsimile.

8. The method of claim 5 wherein said report is sent to said location where said customer keeps said customer's account via facsimile.

9. The method of claim 1 wherein said initiating step is done by said first representative contacting said processing system via telephone.

10. The method of claim 1 wherein the connection in said connecting step between said customer and said second representative is done via telephone.

11. The method of claim 1 further comprising the step of:
validating the identification of said customer by said second representative soliciting information from said customer and comparing said information to corresponding information stored in said records of said customer.

12. The method of claim 1 wherein said step of validating said first representative's identification further comprises the step of identifying said second language from said first data.

13. The method of claim 1 wherein said first language is English.

14. The method of claim 1 wherein said second language is English.

15. The method of claim 1 wherein said second representative works in said home country.

16. The method of claim 1 wherein said step of informing said first representative of said authorization is done by said processing system communicating with said first representative in said second language.

17. The method of claim 1 further comprising the step of:
concurring with said authorization by said first representative signalling said processing system of said first representative's concurrence with said second representative's authorization of said financial transaction.

18. The method of claim 1 further comprising the steps of:
communicating the specifics of said financial transaction from said second representative to said processing system based upon said discussion between said second representative and said customer; and analyzing said financial transaction in different currencies by said processing system accessing a database containing different currency exchange rates; and reporting said analysis to said second representative from said processing system.

19. The method of claim 18 wherein said analysis is done in at least the currencies of said home country and said second country.

20. The method of claim 19 wherein said analysis is also done in the currency of the United States.

21. The method of claim 1 wherein said consummating step includes said first representative giving said customer cash.

22. The method of claim 21 wherein said cash includes cash in the currency of said second country.

23. The method of claim 21 wherein said cash includes cash in the currency of said second country, in part, and cash in the currency of said home country, in part.

24. The method of claim 21 wherein said cash includes cash in the currency of the United States.

25. In a system for performing financial transactions comprising a customer who resides in a home country in which a first language is spoken and is a customer of a financial institution and a first representative of said financial institution who works in a second country and who speaks a second language wherein:

said first representative initiates said financial transaction by contacting a processing system and inputs first data corresponding to the identification of said first representative;

said processing system validates said first representative's identification;

said processing system prompts said customer to identify said first language by said processing system prompting said customer in different languages including said first language;

said processing system identifies said first language as a result of said customer's response to said prompts;

said processing system uses said first language to prompt said customer to identify said customer's home country by said processing system prompting said customer with different countries which use said first language including said home country;

said processing system identifies said home country in response to said customer's response to said prompts;

said processing system identifies and contacts a second representative affiliated with said financial institution and which speaks said first language and which has access to said customer's financial records and accounts in said financial institution via a communication between said processing system and said second representative;

said processing system validates the identification of said second representative;

said processing system connects said customer and said second representative via said processing system;

said customer and said second representative discuss said financial transaction in said first language;

said second representative authorizes said financial transaction as a result of said second representative accessing said financial records of said customer;

said processing system informs said first representative of said authorization; and said customer and said first representative consummate said financial transaction.

26. The system of claim 25 wherein said financial transaction is an emergency cash payment.

27. The system of claim 25 wherein said processing system documents said financial transaction by automatically generating at least one report.

28. The system of claim 27 wherein said processing system automatically generates a report sent to the location where said first representative works.

29. The system of claim 27 wherein said processing system automatically generates a report sent to the location where said customer keeps said customer's account.

30. The system of claim 27 wherein said processing system automatically generates a report stored in a central file of financial transactions performed with said processing system.

31. The system of claim 28 wherein said report is sent to said location where said first representative works via facsimile.

32. The system of claim 29 wherein said report is sent to said location where said customer keeps said customer's account via facsimile.

33. The system of claim 25 wherein said initiation is done by said first representative contacting said processing system via telephone.

34. The system of claim 25 wherein the connection between said customer and said second representative is done via telephone.

35. The system of claim 25 wherein said second representative validates the identification of said customer by soliciting information from said customer and comparing said information to corresponding information stored in said records of said customer.

36. The system of claim 25 wherein said processing system also identifies said second language from said first data.

37. The system of claim 25 wherein said first language is English.

38. The system of claim 25 wherein said second language is English.

39. The system of claim 25 wherein said second representative works in said home country.

40. The system of claim 25 wherein said processing system informs said first representative of said authorization by communicating with said first representative in said second language.

41. The system of claim 25 further wherein said first representative concurs with said authorization by said second representative by said first representative signalling said concurrence to said processing system.

42. The system of claim 25 further wherein:

said second representative communicates the specifics of said financial transaction to said processing system based upon said discussion between said second representative and said customer; and said processing system analyzes said financial transaction in different currencies by accessing a database containing different currency exchange rates; and from said processing system reports said analysis to said second representative.

43. The system of claim 42 wherein said analysis is done in at least the currencies of said home country and said second country.

44. The system of claim 43 wherein said analysis is also done in the currency of the United States.

45. The system of claim 25 wherein said consummation includes said first representative giving said customer cash.

46. The system of claim 45 wherein said cash includes cash in the currency of said second country.

47. The system of claim 45 wherein said cash includes cash in the currency of said second country, in part, and cash in the currency of said home country, in part.

48. The system of claim 45 wherein said cash includes cash in the currency of the United States.

* * * * *